United States Patent
Pawar et al.

(10) Patent No.: US 12,235,796 B2
(45) Date of Patent: Feb. 25, 2025

(54) DETECTING SEQUENTIAL FILE ACCESS

(71) Applicant: Dell Products L.P., Round Rock, TX (US)

(72) Inventors: Sitaram Pawar, Shrewsbury, MA (US); Jean-Pierre Bono, Westboro, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 135 days.

(21) Appl. No.: 18/156,858

(22) Filed: Jan. 19, 2023

(65) Prior Publication Data

US 2024/0248876 A1 Jul. 25, 2024

(51) Int. Cl.
*G06F 16/00* (2019.01)
*G06F 16/13* (2019.01)
*G06F 16/176* (2019.01)
*G06F 16/182* (2019.01)

(52) U.S. Cl.
CPC .......... *G06F 16/13* (2019.01); *G06F 16/1774* (2019.01); *G06F 16/182* (2019.01)

(58) Field of Classification Search
CPC ..... G06F 16/13; G06F 16/182; G06F 16/1774
See application file for complete search history.

(56) References Cited

U.S. PATENT DOCUMENTS

| | | | |
|---|---|---|---|
| 7,447,786 | B2 | 11/2008 | Loaiza et al. |
| 9,811,545 | B1* | 11/2017 | Bent ............... G06F 16/2228 |
| 10,346,360 | B1* | 7/2019 | Basov ............... G06F 16/182 |
| 2006/0136376 | A1 | 6/2006 | Jain et al. |
| 2006/0200677 | A1 | 9/2006 | Marinescu |
| 2006/0282481 | A1 | 12/2006 | Zhou et al. |
| 2007/0088919 | A1 | 4/2007 | Shen et al. |
| 2011/0276549 | A1 | 11/2011 | Fathalla |
| 2012/0330894 | A1 | 12/2012 | Slik |
| 2020/0334155 | A1 | 10/2020 | Alshawabkeh et al. |
| 2021/0073134 | A1* | 3/2021 | Allu ............... G06F 11/1458 |

(Continued)

OTHER PUBLICATIONS

Office Action mailed Apr. 15, 2024 for U.S. Appl. No. 18/156,834, 57 pages.

(Continued)

*Primary Examiner* — Thu Nguyet T Le
(74) *Attorney, Agent, or Firm* — Amin, Turocy & Watson, LLP

(57) ABSTRACT

Committing of mappings and data lock transitioning associated with files can be performed and managed. Regarding a write operation to write a file portion to a node of a node network, network management component (NMC) can analyze write stream value associated with file portion and write stream-related index value associated with the file, where write stream-related index values can be associated with tracks of a track table. Based on the analyzing, NMC can determine whether a file access pattern associated with file portion is sequential or random; and, if sequential, whether there is an overflow condition associated with the track table. If sequential, and an overflow condition exists, NMC can commit, to data store, a mapping of another file portion associated with another stored stream value stored in track table, and/or transition exclusive data lock to shared data lock with respect to the other file portion.

20 Claims, 10 Drawing Sheets

(56) References Cited

U.S. PATENT DOCUMENTS

2022/0004442 A1   1/2022   Liguori et al.

OTHER PUBLICATIONS

Nick Trimbee "OneFS File Locking and Concurrent Access" Dell Technologies, https://infohub.delltechnologies.com/p/onefs-file-locking-and-concurrent-access/, Mar. 14, 2022, Last Accessed Apr. 19, 2023, 6 pages.
Notice of Allowance mailed Sep. 5, 2024 for U.S. Appl. No. 18/156,834, 34 pages.

* cited by examiner

DETECTING SEQUENTIAL FILE ACCESS

BACKGROUND

A group (e.g., cluster) of nodes can provide a set of services to clients. The nodes of the group can be connected to each other to form a distributed network of nodes. The set of services can include enabling clients to create a file and write data to the file in a node(s) of the group of nodes for storage in the node(s) or read data from a file stored in a node(s) of the group of nodes.

The above-described description is merely intended to provide a contextual overview regarding distributed node systems, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise, in connection with a write operation to write a portion of a file to a node of a distributed node network, analyzing, by a system comprising a processor, a write stream value associated with the portion of the file and a write stream-related index value associated with the file. The method further can comprise based on a result of the analyzing of the write stream value and the write stream-related index value, determining, by the system, whether a file access pattern associated with the portion of the file is a sequential file access pattern indicative of a sequential file access of the file, to facilitate write transaction commitment management or data lock management associated with the file.

In certain embodiments, the disclosed subject matter can comprise a system that can include a memory that can store computer executable components, and a processor that can execute computer executable components stored in the memory. The computer executable components can comprise a node of a distributed network of nodes. The computer executable components also can comprise a network management component that, with regard to a section of a file being written to, and stored in, the node, analyzes a write stream value associated with the section of the file and a write stream-related index value associated with the file, and, based on a result of the analysis, determines whether a write pattern associated with the section of the file is a sequential write pattern indicative of a sequential write of the file, to facilitate write transaction commitment management or data lock management associated with the file.

In still other embodiments, the disclosed subject matter can comprise a non-transitory machine-readable medium, comprising executable instructions that, when executed by a processor, can facilitate performance of operations. The operations can comprise, with regard to a write operation to write a section of a file to a node device of a distributed network of node devices, evaluating a write stream value associated with the section of the file and a write stream-related index value associated with the file. The operations also can comprise, based on a result of the evaluating, determining whether a write pattern associated with the section of the file is a sequential write pattern indicative of a sequential write associated with the file or a random write pattern indicative of a random write associated with the file.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
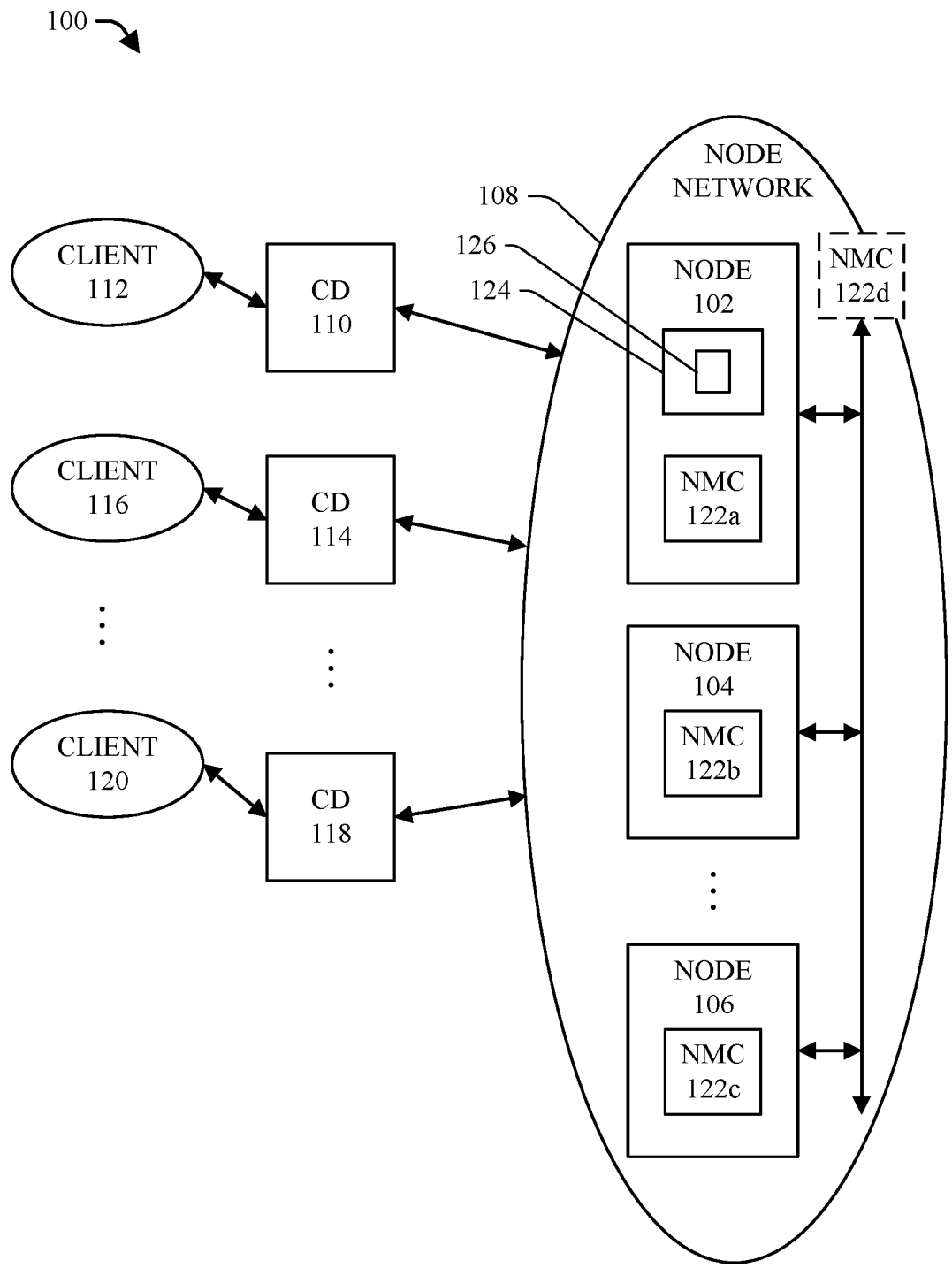
FIG. 1 illustrates a block diagram of an example system that can desirably perform and manage committing of mappings and data lock transitioning associated with files in a node network, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to distributed node systems, for example, to detecting sequential file access patterns in distributed node systems. A group (e.g., cluster) of nodes can provide a set of services to clients. The nodes of the group can be connected to each other to form a distributed network of nodes. The set of services can include enabling clients to create a file and write data to the file in a node(s) of the group of nodes for storage in the node(s) or read data from a file stored in a node(s) of the group of nodes.

Consider a distributed node system, such as a storage scale out system, with a server that can share a file with multiple client nodes. A client can access the file by obtaining a mapping associated with the file from the server using a desired protocol (e.g., parallel network file system (pNFS) protocol or other type of protocol that can be utilized with a file system). The mapping operations can incur cost on the server and clients. The in-progress or active operations have to be tracked in the memory of a node(s) and in filesystem journals of or associated with the nodes. This overhead can increase the memory footprint of the memory, and can increase the recovery journal size. The longer the operations stay active, the longer the amount of time that data locks (e.g., exclusive data lock or other type of data lock) associated with the file(s) may be held, which can undesirably decrease operation concurrency. It also can negatively impact server failover and recovery time, since it has to reconcile more journal transactions.

With further regard to data locks, some types of distributed node systems (e.g., distributed node network systems) can employ different types of data locks to protect file data being written to and/or stored in nodes of such a distributed node system. For instance, there can be an exclusive data lock that can allow, to a client (e.g., user, client device, application, or other entity), exclusive access to a file, or portion thereof, stored in a node such that other clients can be denied access to the file, or portion thereof, while the exclusive data lock associated with that file, or portion thereof, is in place. There also can be a shared data lock that can allow clients, including clients other than the client who created the file, or portion thereof, to access and read the file, or portion thereof.

For instance, when a file is newly created by a client on a node of a distributed node system, the client (e.g., the writer of the file) can obtain exclusive access to the file, via the exclusive data lock, and start writing data to the file. The exclusive data lock can be cached (e.g., stored) on the node on which the writing of data took place. Once a reader (e.g., another client that wants to read the file) comes in on another node, the reader typically may have to request a shared data lock from a coordinator associated with the other node, and the coordinator, in turn, may have to revoke the exclusive data lock from the node on which the client (e.g., writer) was writing. The process of revoking an exclusive data lock from a client and providing a shared data lock for another client with respect to a file, or portion thereof, can have an undesirably significant latency cost.

This can be relevant in a number of situations, including, for example, in typical data pipeline applications where one process can stream data from an external source onto a shared file system (e.g., a distributed node system comprising a shared file system), and that data is processed by a compute cluster (e.g., one or more nodes of the distributed node system and/or one or more clients associated therewith) as soon as the data has fully landed on the storage system of the shared file system, and sometimes even before the data has fully landed on the storage system.

Existing approaches for situations involving an exclusive data lock on a file that is associated with a client (e.g., writer client), or portion thereof, where another client (e.g., reader client) desires to access and read the file, or portion thereof, include relying on a time out of a timer to release the exclusive data lock, advising customers to target clients that desire to access certain files to the same node, or relying on the undesirably costly three-way lock reclaim via the coordinator (e.g., reader client requests share lock, and coordinator initiates revoking of the exclusive data lock and providing a shared data lock). Such existing approaches for releasing an exclusive data lock and implementing a shared data lock with respect to a file, or portion thereof, can be undesirable, costly, and/or otherwise inefficient.

The disclosed subject matter can overcome these and other deficiencies of existing approaches for managing mappings and managing data locks associated with files, or portions thereof. To that end, techniques for desirably (e.g., efficiently, suitably, or optimally) managing mappings and managing data locks associated with files in node networks are presented. A system (e.g., a distributed node network system) can comprise a group of nodes that can be utilized to process information and provide services to clients (e.g., users and communication devices of users). In some embodiments, the nodes of the group of nodes can be associated with (e.g., communicatively connected to or networked with) the other nodes of the group of nodes.

In accordance with various embodiments, the disclosed subject matter can comprise a network management component (NMC) that can managing mappings and manage data locks associated with files in the node networks. In accordance with various embodiments, the NMC can reduce (e.g., decrease or minimize) the number of active operations by desirably (e.g., suitably, efficiently, enhancedly, or optimally) committing active mappings associated with files, or portions thereof (e.g., in the background or as otherwise desired). For instance, the NMC can employ commit logic (e.g., background commit logic) that can commit mappings associated with files that are determined to be less likely to be accessed by a client device again (e.g., at least in the near future). This can desirably reduce the contention amongst the applications and client devices sharing the file, can desirably reduce the memory footprint on the storage servers and the client devices, and can desirably reduce the recovery time.

In some embodiments, the NMC can detect whether the file access pattern (e.g., write pattern) is a sequential access pattern associated with a sequential file access operation or a random access pattern associated with a random file access operation, which can facilitate (e.g., assist in or enable) identifying or determining candidate mappings associated with files, or portions (e.g., section, chunk, or other portion) thereof, for commit.

For instance, with regard to a file, the NMC can create a track table comprising a desired number of tracks, wherein the respective tracks can be associated with respective track indexes. With regard to a write operation to write a portion of the file to a node of a node network, the NMC can analyze a write stream value associated with the portion of the file and a write stream-related index value associated with the track table (e.g., associated with a track index and associated track of the track table) associated with the file and/or a total value (e.g., overflow value) associated with (e.g., indicative of) an overflow condition associated with the track table, where respective write stream-related index values can be associated with (e.g., stored in or otherwise associated with) respective track indexes and associated tracks of the track table. The NMC can determine (e.g., calculate) the write stream value as a function of an offset (e.g., offset value) associated with the portion of the file and a data chunk size associated with the portion of the file. The NMC can determine the total value as a function of the write stream-related index value and the number of tracks of the track table).

Based at least in part on the results of the analyzing and a defined match criterion relating to write stream values, the NMC can determine whether a file access pattern associated with portion of the file is sequential or random; and, if sequential, can determine whether there is an overflow condition associated with the track table (e.g., an overflow condition associated with a track index and associated track of the track table). If, based at least in part on the results of analyzing (e.g., comparing), the NMC determines that the write stream value satisfies the defined match criterion with respect to (e.g., matches) the write stream-related index value, the NMC can determine that the portion of the file is associated with a sequential file access pattern (e.g., a sequential write pattern). In response, the NMC can store the write stream value in the track, in the track table, that is associated with the track index that corresponds to the write stream-related index value.

If, instead, based at least in part on the results of analyzing, the NMC determines that the write stream value satisfies the defined match criterion with respect to (e.g., matches) the total value associated with (e.g., indicative of) an overflow condition associated with the track table, the NMC can determine that the portion of the file is associated with a sequential file access pattern, and there is an overflow condition associated with the track table. For instance, the NMC can determine that an overflow condition exists with respect to the track index and associated track of the track table that are associated with the write stream-related index value in that a previous write stream value is already stored in the track associated with the track index.

If the NMC determines that such an overflow condition exists, the NMC can commit or facilitate committing (e.g., as part of a background commit operation), to the data store, a mapping associated with the previous file portion (and/or other information associated with the write transaction) associated with the stored write stream value that is stored in the track associated with the track index of the track table. In response to the committing of that mapping to the data store, the NMC can delete the previous stored write stream value from the track associated with the track index (which can correspond to the write stream-related index value). The NMC can store the write stream value associated with the file portion in the track associated with the track index (which can correspond to the write stream-related index value). In some embodiments, in response to committing the mapping, and/or in response to determining that the file access pattern is sequential and there is the overflow condition associated with the track index and associated track of the track table, the NMC can transition (e.g., proactively transition, switch, change, or downgrade) an exclusive data lock associated with the previous portion of the file to a shared data lock with respect to the previous portion of the file.

If, instead, based at least in part on the results of analyzing, the NMC determines that the write stream value does not satisfy the defined match criterion with respect to the write stream-related index value or the total value, the NMC can determine that the portion of the file is associated with a random file access pattern (e.g., a random write pattern). In response to determining that the portion of the file is associated with a random file access pattern, the NMC can determine that a mapping associated with the portion of the file is to be committed based at least in part on an age of such mapping since when such mapping was last utilized (e.g., an amount of time since such mapping was last utilized by a client device or other entity).

These and other aspects and embodiments of the disclosed subject matter will now be described with respect to the drawings.

Referring now to the drawings, FIG. 1 illustrates a block diagram of an example system 100 that can desirably (e.g., efficiently, suitably, or optimally) perform and manage committing of mappings and data lock transitioning associated with files in a node network (e.g., a distributed node network), in accordance with various aspects and embodiments of the disclosed subject matter. The system 100 can comprise a group (e.g., cluster) of nodes (e.g., node equipment or devices), which can comprise a desired number of nodes, including node 102, node 104, and node 106. The nodes (e.g., 102, 104, and/or 106) can be grouped or networked together to form a node network 108, such as a distributed node network. The node network 108 can comprise a file system that can utilize one or more types of protocols to facilitate performance of data management, file management, data processing, file and data storage, file and data communications or transfers, and/or other file and data related functions and processes by the node network. The protocols employed by the node network can comprise virtually any desired protocol, such as, for example, network file system (NFS), pNFS, server message block (SMB), common Internet file system (CIFS), Hadoop compatible file system (HCFS), Hadoop distributed file system (HDFS), file transfer protocol (FTP), OpenStack Swift, hypertext transfer protocol (HTTP), or other desired protocol that can be utilized in file systems.

Each node (e.g., 102, 104, and/or 106) can comprise, employ, and/or access data processing resources (e.g., processor(s)), storage resources (e.g., data store(s)), applications, and/or other resources that can enable the node to perform one or more services. The one or more services can be or can relate to, for example, data processing, video streaming, audio streaming, data security or protection, multimedia service, news service, financial service, social networking, and/or another desired type of service. The nodes can be associated with (e.g., communicatively connected to) each other, for example, through a back-end network.

Each node (e.g., 102, 104, and/or 106) also can comprise a desired number of interfaces (e.g., network or interconnect interfaces), such as described herein. The interfaces of a node can be or can comprise network interfaces or other types of interfaces that can be associated with network addresses and can be utilized to facilitate (e.g., enable) transmitting or presenting information to a user (e.g., client or other user) or a device (e.g., a service server, another node, or a client or communication device, such as a computer, a server, a mobile or smart phone, a virtual assistant (VA) device, an Internet of Things (IOT) device, or other device), or receiving information (e.g., query or request for a service: or request for information) from a user, an application, a service server, or a communication device. Network addresses can be of various types, versions, and/or formats, which can comprise, for example, IP version 4 (IPv4) (e.g., an IPV4 address can be a 32-bit IPv4 address), IP version 6 (IPv6) (e.g., an IPV6 address that can be a 128-bit IPv6 address), and/or other desired type, version, and/or format of network address.

At various times, client devices, such as client device (CD) 110 associated with client 112, client device 114 associated with client 116, and/or client device 118 associated with client 120, can be associated with (e.g., communicatively connected to, via a wired or wireless communication connection) respective nodes (e.g., 102, 104, and/or 106) of the node network 108. For instance, a client device (e.g., 110, 114, or 118) can be connected to a node (e.g., 102, 104, or 106) to write or communicate data (e.g., a query, sensor data, user data, application or service related data, or other data) to the node, or read or receive data (e.g., response to a query, sensor data, user data, application or service related data, or other data) from the node. A client (e.g., 112, 116, or 120) associated with a client device (e.g., 110, 114, or 118) can be a human user, a non-human user, a VA or VA device, an application, a service, another client device, a device or system, or other entity.

As disclosed, it can be desirable to determine (e.g., detect or identify) when a file access, such as writing a portion of a file to the memory or the data store, is a sequential file access or a random file access, as this can facilitate determining candidate mappings associated with file portions that can be committed to the data store and/or determining whether an exclusive data lock associated with a file portion can be transitioned (e.g., proactively transitioned) to a shared data lock. To that end, in accordance with various embodiments, the system 100 can employ a network management component (NMC) 122 that can desirably (e.g., suitably, efficiently, reliably, enhancedly, or optimally) manage mappings and manage data locks associated with files (e.g., being written to nodes (e.g., 102, 104, or 106)), or portions thereof, in accordance with the defined network management criteria, and can desirably overcome the deficiencies of existing approaches for managing mappings and managing data locks associated with files, or portions thereof, such as described herein. In some embodiments, each node (e.g., 102, 104, 106) can comprise an NMC (e.g., NMC 122a, NMC 122b, and NMC 122c, respectively) that can perform and manage mappings and manage data locks (e.g., manage proactive transitioning, switching, changing, or downgrading of data locks) associated with files, or portions thereof, being written to nodes (e.g., 102, 104, or 106). In other embodiments, an NMC 122 can reside in one (or more) of the nodes, or can be a standalone component (e.g., NMC 122d), or can reside in another device or component, wherein the NMC 122 can be associated with (e.g., communicatively connected to) all of the nodes, and can perform and manage mappings and data lock transitioning on behalf of all of the nodes of the node network 108.

Figure 2:
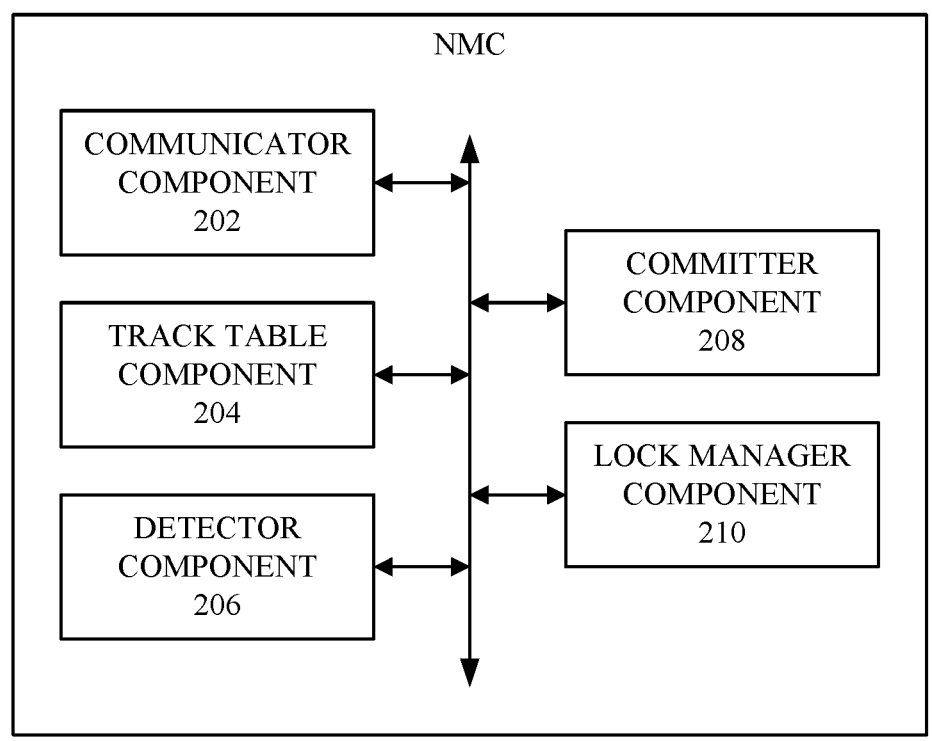
FIG. 2 illustrates a block diagram of an example network management component, in accordance with various aspects and embodiments of the disclosed subject matter.
Figure 3:
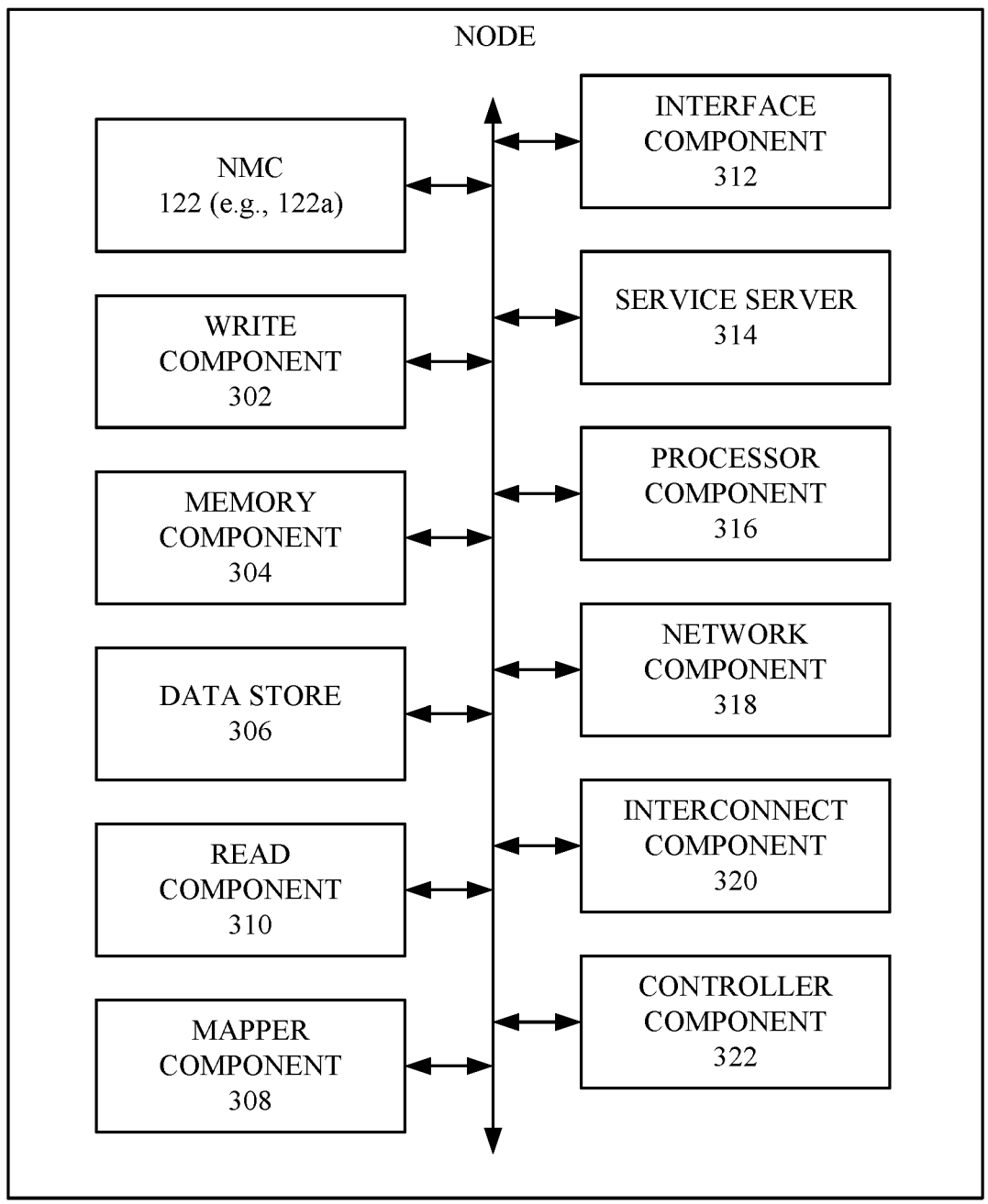
FIG. 3 depicts a block diagram of example node, in accordance with various aspects and embodiments of the disclosed subject matter.

Referring to FIGS. 2 and 3 (along with FIG. 1), FIG. 2 depicts a block diagram of the NMC 122, and FIG. 3 illustrates a block diagram of an example node 102, in accordance with various aspects and embodiments of the disclosed subject matter. In some embodiments, the NMCs (e.g., 122a, 122b, 122c) of the nodes (e.g., 102, 104, 106) of the node network 108, or a standalone NMC 122d, can comprise the same or similar components and functionality as the NMC 122, and/or can be configured the same as or similar to the NMC 122. In accordance with various embodiments, with regard to write or read operations associated with one node (e.g., node 102), the NMC (e.g., NMC 122a) of that node can act as the coordinator and manager of mappings associated with files and/or manager of data locks associated with write operations to write files to that node, or another NMC (e.g., NMC 122b, NMC 122c, or NMC 122d) associated with another node (e.g., node 104 or node 106) or standalone can act as the coordinator and manager of mappings associated with files and/or manager of data locks associated with write operations to write files to that node (e.g., node 102). In certain embodiments, the other nodes (e.g., 104, 106) of the node network 108 can comprise the same or similar components and functionality as the node 102, and/or can be configured the same as or similar to the node 102.

In connection with a write operation involving a write transaction to write a portion of a file to a node (e.g., node 102), the write component 302 can receive file-related information relating to writing of the file, or portion thereof, to the node 102 from the client device (e.g., client 112) that is writing the file and/or another entity, wherein such file-related information can comprise, for example, the data of the file, or portion thereof, that is to be written to the file, metadata associated with the file, and/or other information relating to the writing of the file, or portion thereof. The NMC 122 can employ a communicator component 202 that can receive the file-related information, or a desired portion of the file-related information, from the client device (e.g., client device 110), the associated client (e.g., client 112), the write component 302, a node (e.g., node 102, 104, or 106), and/or another entity.

The NMC 122 can comprise a track table component 204 that, for each desired file, can generate a track table associated with the file based at least in part on the results of analyzing the file-related information. The track table component 204 can group or form respective portions of a write transaction to write data of a file to a node (e.g., node 102, 104, or 106) into streams (e.g., write streams or write data streams) of a desired defined size (e.g., data or chunk size or length), where each write stream can comprise a portion (e.g., chunk or section) of data of the file. In some embodiments, the defined size of a stream (e.g., a portion of a file) can be 4 megabytes (MB), although in other embodiments, the defined size can be configured to be less than or greater than 4 MB. For each stream (e.g., write stream) of a write transaction, the track table component 204 can determine a stream value S (also referred to as write stream value) associated with the write stream using the offset associated with the stream. For instance, the track table component 204 can determine (e.g., calculate) the write stream value S associated with the write stream as a function of the offset associated with the write stream and the defined size (e.g., data or chunk size) of the write stream. For example, the track table component 204 can determine (e.g., calculate) the write stream value S associated with the write stream as the offset associated with the write stream divided by the chunk size of the write stream (e.g., $S_x = \text{offset}_x/(\text{chunk size})$, wherein x can be a variable numerical value where respective numerical values of x can correspond to, and be utilized to indicate or identify, respective write stream values and can correspond to, and be utilized to indicate or identify, respective offset values associated with the respective write streams). The respective offsets associated with the respective write streams of a write transaction can indicate the respective locations of the respective write streams in the overall write stream (e.g., the write dataset) of the write transaction. The track table component 204 can generate and maintain a table, which can be called TrackTable, that the NMC 122 can utilize to track the various (e.g., different) write stream values of the file. The table can comprise a desired defined number (e.g., a default number) of tracks, where respective tracks can be associated with respective track indexes (e.g., track numbers, values, or identifiers). In some embodiments, the defined number of tracks of a table can be 16 tracks, although, in other embodiments, the defined number of tracks of a table can be configured to be less than 16 tracks or greater than 16 tracks.

The track table component 204 can map, for each write stream of a write transaction, the write to the write stream on to a track index (track-index) of the table using a desired function (e.g., mapping function). In some embodiments, the track table component 204 can map, for each write stream (e.g., having write stream value $S_x$) of a write transaction, the write to the write stream on to a track index (track-index) of the table using the following equation, comprising a desired function: track-index=S modulo (number of tracks of the table) (e.g., track-index$_x$=$S_x$ modulo (number of tracks of the table)). The track table component 204 can store the write stream value (e.g., $S_x$) of a write stream for each track of a track table associated with a file in memory (e.g., memory component 304 or data store 306), for example, as TrackTable [track-index]=S (e.g., TrackTable [track-index$_x$]=$S_x$). For instance, the track table component 204 can determine (e.g., calculate) and generate respective write stream-related index values that can be associated with (e.g., correspond to) respective streams of a file, wherein the respective write stream-related index values can be associated with respective track indexes and associated respective tracks of the track table associated with the file. The respective write stream-related index values can correspond to (e.g., be the same as or match) respective write stream values that can be associated with respective portions of a file when the respective portions of the file are associated with a sequential file access (e.g., when the respective portions of the file have or are indicative of a sequential file access pattern). In some embodiments, with regard to each portion of a file, the track table component 204 can determine (e.g., calculate) a write stream-related index value (e.g., track-index$_x$, also referred to herein as $I_x$) associated with a portion of the file as a function of the write stream value S (e.g., $S_x$) associated with a write stream and the size of the track table (e.g., the number of tracks of the track table), such as, e.g., track index=S/(table size) (e.g., track-index$_x$=$S_x$/(table size of the track table)), or as otherwise determined such that the respective write stream-related index values associated with respective track indexes of the track table associated with a file can correspond to (e.g., be the same as or match) the respective write stream values associated with the respective portions of a file when the respective portions of the file are associated with a sequential file access.

The NMC 122 can utilize a track table associated with a file to facilitate determining whether a particular incoming write stream is part of a sequential file access (e.g., sequential write access) or is a random file access (e.g., random write access), such as more fully described herein.

Figure 4:
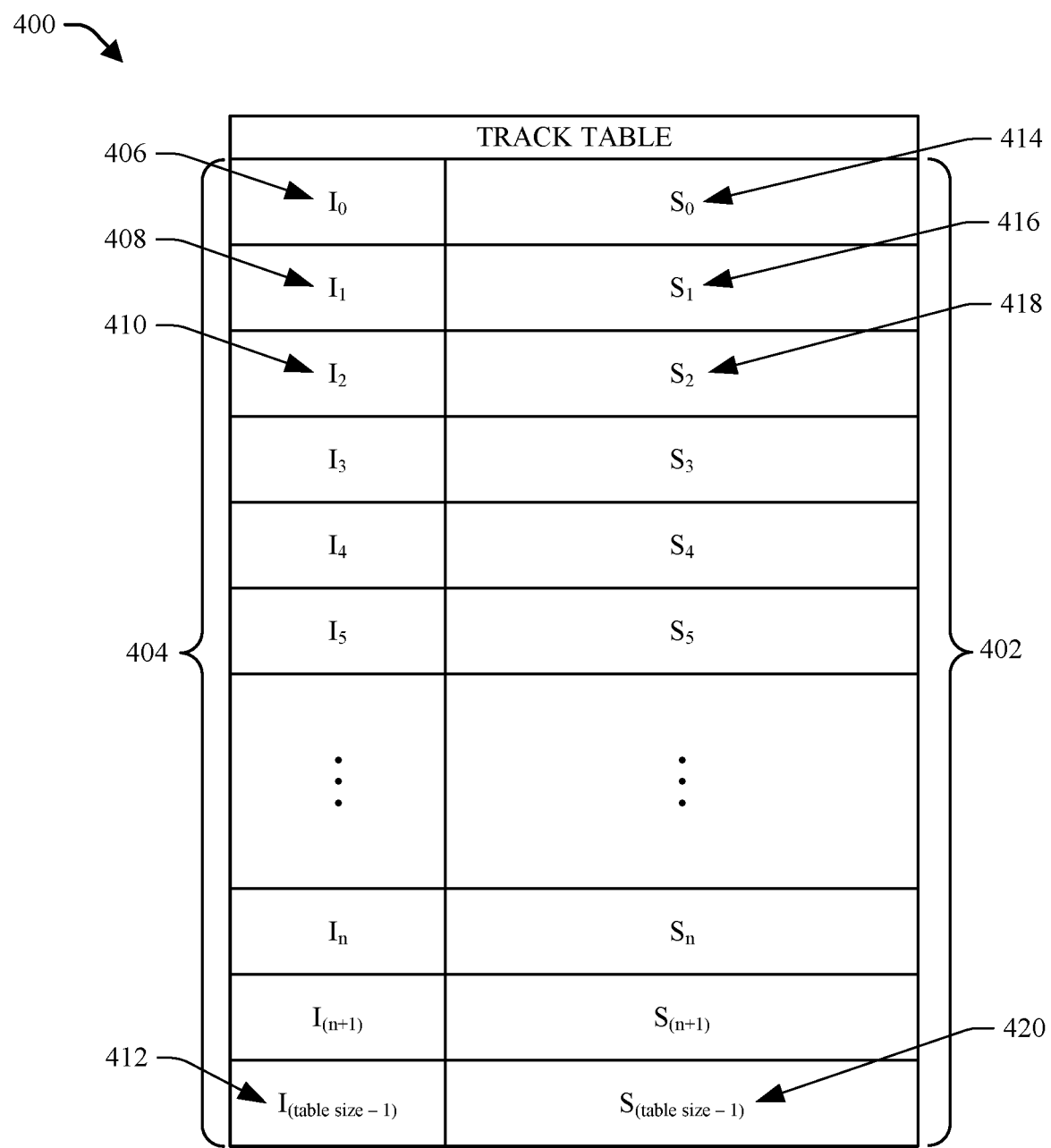
FIG. 4 illustrates a block diagram of an example track table associated with a file, in accordance with various aspects and embodiments of the disclosed subject matter.

Referring to FIG. 4 (along with FIGS. 1, 2, and 3), FIG. 4 illustrates a block diagram of an example track table 400 associated with a file, in accordance with various aspects and embodiments of the disclosed subject matter. The track table component 204 can generate the example track table 400 associated with the file based at least in part on the results of analyzing the file-related information (e.g., data to be written to the file, metadata associated with the file, and/or other desired information relating to the file) associated with the file, or portions thereof, such as described herein.

For example, the track table component 204 can generate the track table 400 that can comprise a group of tracks 402 where respective tracks of the group of tracks 402 can be associated with respective track indexes 404 that can be associated with (e.g., can have) respective write stream-related index values (e.g., $I_x$) that can be determined by the NMC 122 based at least in part on the results of analyzing the file-related information associated with the file. The respective write stream-related index values (e.g., $I_x$) can include, for example, $I_0$ 406, $I_1$ 408, $I_2$ 410 up through $I_{(tablesize-1)}$ 412, where x can be a variable having a numerical value that can range from 0 to (table size−1), and where the table size can be the number of tracks of the table 400. The respective write stream-related index values (e.g., $I_0$ 406, $I_1$ 408, $I_2$ 410 up through $I_{(tablesize-1)}$ 412) of the respective track indexes associated with the respective tracks of the group of tracks 402 can be associated with respective write stream values (e.g., first write stream-related index value $I_0$ 406 associated with first write stream value $S_0$ 414, second write stream-related index value $I_1$ 408 associated with second write stream value $S_1$ 416, third write stream-related index value $I_2$ 410 associated with third write stream value $S_2$ 418, and so on, up through a last write stream-related index value $I_{(tablesize-1)}$ 412 associated with write stream value $S_{(tablesize-1)}$ 420) such that respective write stream values (e.g., $S_0$ 414, $S_1$ 416, $S_2$ 418, and/or other write stream values) associated with respective file portions (e.g., respective write streams, sections, or chunks) of the file can be stored in the respective tracks associated with the respective indexes, having the respective write stream-related index values (e.g., $I_0$ 406, $I_1$ 408, $I_2$ 410, and/or other write stream-related index values), of the track table 400.

It is to be appreciated and understood that, while respective write stream values (e.g., $S_0$ 414, $S_1$ 416, $S_2$ 418, and $S_{(tablesize-1)}$ 420) are depicted in the track table 400 in FIG. 4 for example illustration purposes to indicate where (e.g., which tracks) the respective write stream values are able to be stored in track table 400 if respective write streams associated with such respective write stream values are being written to the node (e.g., node 102) as part of a write transaction (e.g., a write transaction involving a sequential write comprising the respective write streams), in a case where one or more of such respective write streams have not been received by the node (or at least have not yet been received by the node), there will be no corresponding respective write stream values stored in the corresponding respective tracks of the track table 400 (e.g., those respective tracks can be empty or otherwise available to store write stream values). Also, with regard to the track table 400, n, as indicated in the track table 400, can be a variable that can have respective numerical values that can correspond to the respective tracks, respective track indexes, or respective write stream values of or associated with the track table 400.

The disclosed track table scheme can allow the track table component 204 to track multiple streams of writes (e.g., data or file write operations to write respective data to respective files) on a per file basis. This can provide a benefit, for example, for multi-core or distributed applications that can divide and concurrently process data. It can allow for a multi-threaded application performing random write operations (e.g., random 4-kilobytes write operations) around a contiguous storage area (e.g., contiguous 4 MB extent in the data store 306 or other memory location).

Figure 5:
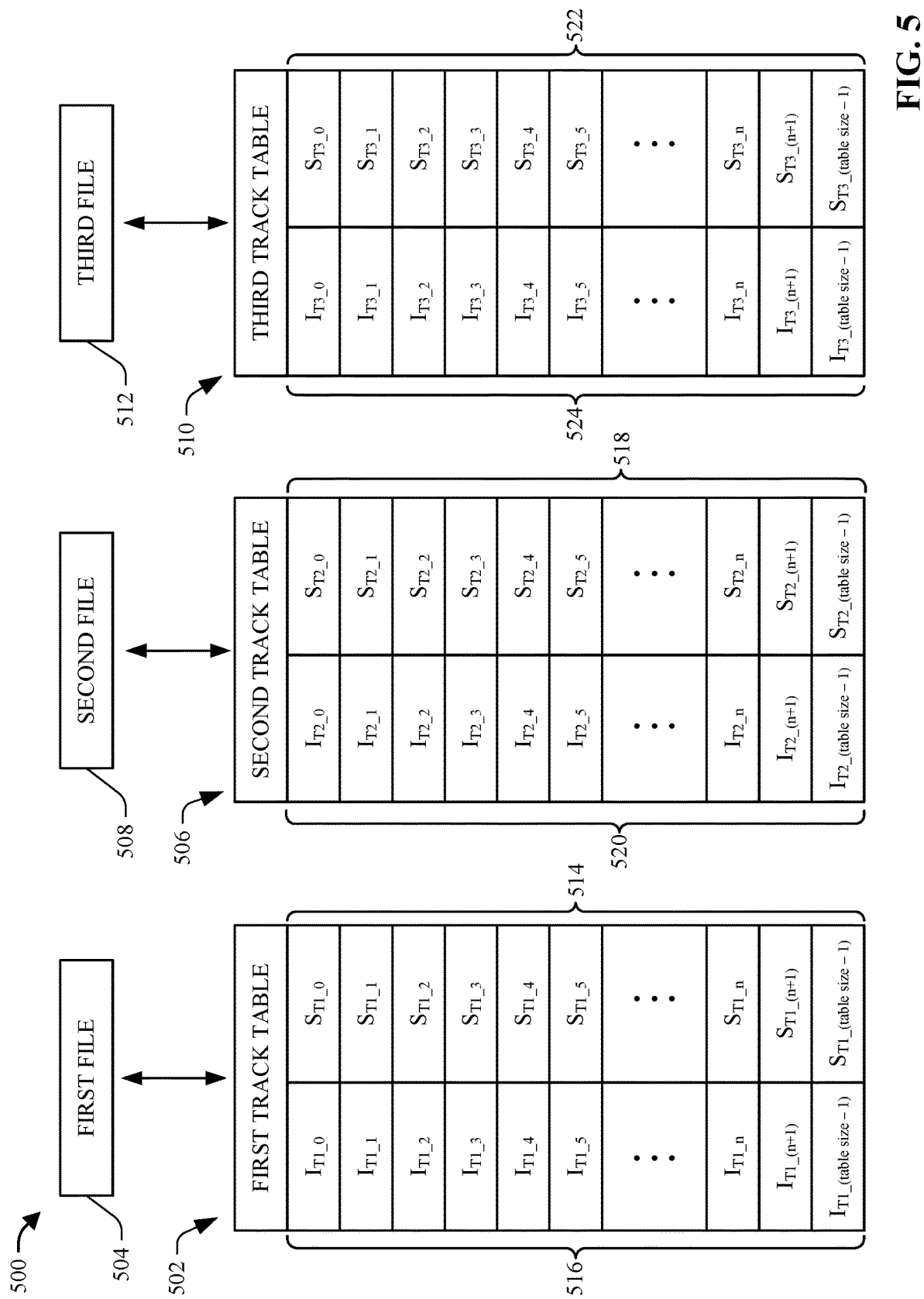
FIG. 5 depicts a block diagram of example respective track tables associated with respective files, in accordance with various aspects and embodiments of the disclosed subject matter.

Referring briefly to FIG. 5 (along with FIGS. 1, 2, and 3), FIG. 5 depicts a block diagram of example respective track tables 500 associated with respective files, in accordance with various aspects and embodiments of the disclosed subject matter. The track table component 204 can generate the respective track tables 500 associated with the respective files based at least in part on the results of analyzing respective items of file-related information (e.g., data to be written to a file, metadata associated with the file, and/or other desired information relating to the file) associated with the respective files, or portions thereof, such as described herein. For instance, the track table component 204 can generate a first track table 502 associated with a first file 504 based at least in part on the results of analyzing first file-related information associated with the first file 504; a second track table 506 associated with a second file 508 based at least in part on the results of analyzing second file-related information associated with the second file 508: a third track table 510 associated with a third file 512 based at least in part on the results of analyzing third file-related information associated with the third file 512; and/or another track table associated with another file based at least in part on the results of analyzing other file-related information associated with the other file.

The first track table 502 (T1) can comprise a first group of tracks 514 where respective tracks of the first group can be associated with respective track indexes 516 that can be associated with respective write stream-related index values (e.g., $I_{T1\_0}$, $I_{T1\_1}$, $I_{T1\_2}$, up through $I_{T1\_(table\ size-1)}$) that can be determined by the NMC 122 based at least in part on the results of analyzing the first file-related information associated with the first file 504, such as described herein. The respective write stream-related index values (e.g., $I_{T1\_0}$, $I_{T1\_1}$, $I_{T1\_2}$, up through $I_{T1\_(table\ size-1)}$) associated with the respective track indexes 516 of the first track table 502 can be associated with (e.g., can correspond to, can match, or can be equal to) respective write stream values (e.g., $S_{T1\_0}$, $S_{T1\_1}$, $S_{T1\_2}$, up through $S_{T1\_(table\ size-1)}$) associated with respective file portions (e.g., respective write streams) of the first file 504. The NMC 122 can determine the respective write stream values (e.g., $S_{T1\_0}$, $S_{T1\_1}$, $S_{T1\_2}$, up through $S_{T1\_(table\ size-1)}$) based at least in part on the results of analyzing the first file-related information associated with the first file 504 (e.g., if and when the respective file portions of the first file 504 are written to the node (e.g., written to the node 102 by the client device 110) during a write transaction that involves a sequential write stream), such as described herein. The NMC 122 can store the respective write stream values in the respective tracks associated with the respective track indexes 516 of the first track table 502, for example, if and when the respective file portions of the first file 504 are written to the node during a write transaction that involves a sequential write stream.

The second track table 506 (T2) can comprise a second group of tracks 518 where respective tracks of the second group can be associated with respective track indexes 520 that can be associated with respective write stream-related index values (e.g., $I_{T2\_0}$, $I_{T2\_1}$, $I_{T2\_2}$, up through $I_{T2\_(tablesize-1)}$) that can be determined by the NMC 122 based at least in part on the results of analyzing the second file-related information associated with the second file 508, such as described herein. The respective write stream-related index values (e.g., $I_{T2\_0}$, $I_{T2\_1}$, $I_{T2\_2}$, up through $I_{T2\_(table\ size-1)}$) associated with the respective track indexes 520 of the second track table 506 can be associated with (e.g., can correspond to, can match, or can be equal to) respective write stream values (e.g., $S_{T2\_0}$, $S_{T2\_1}$, $S_{T2\_2}$, up through $S_{T2\_(tablesize-1)}$) associated with respective file portions of the second file 508. The NMC 122 can determine the respective write stream values (e.g., $S_{T2\_0}$, $S_{T2\_1}$, $S_{T2\_2}$, up through $S_{T2\_(tablesize-1)}$) based at least in part on the results of analyzing the second file-related information associated with the second file 508 (e.g., if and when the respective file portions of the second file 508 are written to a node (e.g., written to node 102, 104, or 106 by the client device 114) during a write transaction that involves a sequential write stream), such as described herein. The NMC 122 can store the respective write stream values in the respective tracks associated with the respective track indexes 520 of the second track table 506, for example, if and when the respective file portions of the second file 508 are written to such node during a write transaction that involves a sequential write stream.

The third track table 510 (T3) can comprise a third group of tracks 522 where respective tracks of the third group can be associated with respective track indexes 524 that can be associated with respective write stream-related index values (e.g., $I_{T3\_0}$, $I_{T3\_1}$, $I_{T3\_2}$, up through $I_{T3\_(tablesize-1)}$) that can be determined by the NMC 122 based at least in part on the results of analyzing the third file-related information associated with the third file 512, such as described herein. The respective write stream-related index values (e.g., $I_{T3\_0}$, $I_{T3\_1}$, $I_{T3\_2}$, up through $I_{T3\_(tablesize-1)}$) associated with the respective track indexes 524 of the third track table 510 can be associated with (e.g., can correspond to, can match, or can be equal to) respective write stream values (e.g., $S_{T3\_0}$, $S_{T3\_1}$, $S_{T3\_2}$, up through $S_{T3\_(table\ size-1)}$) associated with respective file portions of the third file 512. The NMC 122 can determine the respective write stream values (e.g., $S_{T3\_0}$, $S_{T3\_1}$, $S_{T3\_2}$, up through $S_{T3\_(table\ size-1)}$) based at least in part on the results of analyzing the third file-related information associated with the third file 512 (e.g., if and when the respective file portions of the third file 512 are written to a node (e.g., written to node 102, 104, or 106 by the client device 118) during a write transaction that involves a sequential write stream), such as described herein. The NMC 122 can store the respective write stream values in the respective tracks associated with the respective track indexes 524 of the third track table 510, for example, if and when the respective file portions of the third file 512 are written to such node during a write transaction that involves a sequential write stream.

In accordance with various embodiments, the first track table 502, second track table 506, and third track table 510 can comprise the same number of tracks or different numbers of tracks in relation to each other. It is to be appreciated and understood that, while respective write stream values ($S_0$ 414, $S_1$ 416, $S_2$ 418, and $S_{(table\ size-1)}$ 420) are depicted in the respective track tables (e.g., 502, 506, 510) in FIG. 5 for example illustration purposes to indicate where (e.g., which tracks) the respective write stream values are able to be stored in respective track tables if respective write streams associated with such respective write stream values are being written to the respective nodes (e.g., nodes 102, 104, or 106) as part of respective write transactions (e.g., a write transactions involving sequential writes comprising the respective write streams), in a case where one or more of such respective write streams have not been received by the respective node(s) (or at least have not yet been received by the respective node(s)), there will be no corresponding respective write stream values stored in the corresponding respective tracks of the respective track table(s) (e.g., 502, 506, and/or 510). Also, with regard to the example respective track tables 500, n, as indicated in the respective track tables 500, can be a variable that can have respective numerical values that can correspond to the respective tracks, respective track indexes, or respective write stream values of or associated with the respective track tables 500.

In accordance with various embodiments, the NMC 122 can employ a track table associated with a file to facilitate determining whether an incoming write stream associated with a write operation (e.g., write stream associated with a write transaction associated with the write operation) to write a portion of the file to a node (e.g., node 102, 104, or 106) is part of a sequential file access or considered a random file access. In some embodiments, the NMC 122 can comprise a detector component 206 that can determine, detect, and/or identify whether an incoming write stream associated with a write operation to write the portion (e.g., section, chunk, or other portion of data) of the file to a node (e.g., node 102, 104, or 106) is part of a sequential file access or considered a random file access based at least in part on the results of analyzing a write stream value S (e.g., St) associated with the portion of the file (e.g., the incoming write stream) and a write stream-related index value (e.g., track-index$_x$ or I$_x$) associated with the track table associated with the file and/or a total value (e.g., overflow value) associated with the track table, wherein the total value can be associated with an overflow condition that can be associated with the track table. With regard to total values (e.g., overflow values), the track table component 204 can determine (e.g., calculate) respective total values associated with respective track indexes associated with respective tracks of a track table associated with a file as a function of respective write stream-related index values associated with the respective track indexes and a value associated with (e.g., representing or corresponding to) the number of tracks of the track table. In some embodiments, a total value associated with a track index associated with a track of a track table can represent or correspond to (e.g., can be equal to the sum of) the write stream-related index value associated with the track index and the value associated with the number of tracks of the track table (e.g., total value=TrackTable[track-index]+number of tracks of the track table). The track table component 204 can associate (e.g., link, map, or otherwise associate) the respective total values (e.g., respective overflow values) with the respective track indexes associated with the respective tracks of the track table.

As an example of sequential file access detection (and/or track table overflow detection) or random file access detection, the detector component 206 can analyze (e.g., compare) the write stream value associated with the portion of the file and a write stream-related index value associated with a track index associated with a track of the track table and/or a total value associated with the track table (e.g., overflow value associated with the track index associated with the track). The detector component 206 can determine whether the write stream value associated with the portion of the file satisfies a defined match criterion with respect to (e.g., determine whether the write stream value matches (or at least sufficiently or substantially matches)) the write stream-related index value or the total value associated with the overflow condition based at least in part on the result of the analysis (e.g., the comparison) and the defined match criterion.

If the detector component 206 determines that the write stream value does not satisfy the defined match criterion with respect to (e.g., does not match) the write stream-related index value or the total value associated with the overflow condition, this can indicate that the portion of the file is associated with a random file access pattern (e.g., the portion of the file is part of a random file access operation). Accordingly, if the detector component 206 determines that the write stream value does not satisfy the defined match criterion with respect to the write stream-related index value or the total value associated with the overflow condition, the detector component 206 can determine that the portion of the file is associated with a random file access pattern.

In response to determining that the portion of the file is associated with a random file access pattern, the NMC 122, employing a committer component 208, can determine a time for committing a mapping associated with the portion of the file to the data store 306 based at least in part on an amount of time that has elapsed (e.g., an age of the mapping) since the mapping was last utilized (e.g., by a client device or other entity). The mapping associated with the portion of the file can comprise information (e.g., mapping information) that can indicate or specify a storage location of the portion of the file in the memory component 304 or data store 306. The committer component 208 can commit or facilitate committing the mapping and/or other information associated with the write transaction (e.g., write transaction involving the portion of the file) to the data store 306 at the determined time for committing.

If, instead, the detector component 206 determines that the write stream value satisfies the defined match criterion with respect to (e.g., matches) the write stream-related index value associated with the track index, this can indicate that the portion of the file is associated with a sequential file access pattern (e.g., the portion of the file is part of a sequential file access operation). Accordingly, if the detector component 206 determines that the write stream value satisfies the defined match criterion with respect to the write stream-related index value associated with the track index, the detector component 206 can determine that the portion of the file is associated with a sequential file access pattern.

If the write stream value satisfies the defined match criterion with respect to the write stream-related index value associated with the track index, this also can indicate that a write stream value is not currently stored in the track associated with the track index in the track table associated with the file. Accordingly, if the detector component 206 determines that the portion of the file is associated with a sequential file access pattern, the track table component 204 can store the write stream value in the track associated with the track index in the track table stored in the memory (e.g., stored in memory in the memory component 304 or other desired memory of or associated with the node). The track in which the write stream value is stored can be the track that is associated with the track index that is associated with (e.g., corresponds to or is representative of) the write stream-related index value.

For example, if the detector component 206 determines that the write stream value (e.g., write stream value S$_2$) associated with the portion of the file satisfies the defined match criterion (e.g., corresponds to, matches, or is equal to) with respect to the write stream-related index value (e.g., I$_2$ 410) associated with the track index associated with the track of the track table (e.g., track table 400), the detector component 206 can determine that the portion of the file can be associated with a sequential file access pattern. Also, if the detector component 206 determines that the portion of the file is associated with a sequential file access pattern, the track table component 204 can store the write stream value (e.g., write stream value S$_2$ 418) associated with the file portion in the track associated with the track index (e.g., track index associated with the write stream-related index value I$_2$ 410) in the track table 400 stored in the memory (e.g., stored in memory in the memory component 304 or other desired memory of or associated with the node).

With regard to an overflow condition associated with a track table associated with a file, when the NMC 122 stores respective write stream values in respective tracks of the track table in connection with a sequential write of a file, the NMC 122 can store the respective write stream values (e.g., $S_0$ 414, $S_1$ 416, $S_2$ 418, and/or $S_{(table\ size-1)}$ 420) in the respective tracks in order of the respective track indexes (e.g., associated with respective write stream-related index values $I_0$ 406, $I_1$ 408, $I_2$ 410, and/or $I_{(table\ size-1)}$ 412) associated with the respective tracks proceeding from the first track (e.g., associated with write stream-related index value $I_0$ 406) to the last track (e.g., associated with write stream-related index value $I_{(table\ size-1)}$ 412) of the track table. With regard to a sequential write of a file, or portion thereof, when a write stream value has been stored in the last track (e.g., associated with $I_{(table\ size-1)}$) of the track table, if there are one or more other file portions of the file that are still being written to the node, the entry (e.g., storage) of write stream values in the track table can wrap around such that, for a next write stream value associated with a next file portion (e.g., a next write stream of the sequential write stream), the desired (e.g., target) track for storing the next write stream value can be the first track (e.g., associated with $I_0$) of the track table. However, there may be a previous write stream value stored in the first track already, which can indicate an overflow condition associated with the first track of the track table. Depending on the number of file portions of a file being written to a node as part of a sequential write and the number of tracks in the associated track table, there potentially may be one or more overflow conditions associated with one or more tracks of the track table that can occur during the write transaction to write portions of the file to the node.

In some embodiments, if the detector component 206 determines that the write stream value satisfies the defined match criterion with respect to (e.g., matches) a total value (e.g., overflow value) associated with an overflow condition that is associated with (e.g., linked to or otherwise associated with) a track index, and associated track, associated with the track table (instead of a match to a write stream-related index value, or no match to either a write stream-related index value or the total value), rather than matching the write stream-related index value associated with the track index (or not matching any value associated with the track table), the detector component 206 can determine that the portion of the file is associated with a sequential file access pattern and there is an overflow condition (e.g., a collision condition) associated with the track index, and associated track, of the track table. For instance, if the write stream value satisfies the defined match criterion with respect to the total value associated with the overflow condition, this can indicate that the portion of the file can be associated with a sequential file access pattern (e.g., the portion of the file can be part of a sequential file access operation) and also can indicate that there is an overflow condition associated with the track associated with the track index that is associated with the write stream-related index value. That is, the overflow condition can indicate that a previous write stream value, which can be or correspond to a previous portion (e.g., previously written portion) of the file, is stored in the track associated with the track index that is associated with the write stream-related index value, which can result in a collision or potential collision between the previous write stream value already stored in the track and the write stream value that is to be stored in that track. Accordingly, if the detector component 206 determines that the write stream value satisfies the defined match criterion with respect to the total value associated with the overflow condition, the detector component 206 can determine that the portion of the file is associated with a sequential file access pattern and also can determine that there is an overflow condition associated with the track associated with the track index that is associated with the write stream-related index value.

The committer component 208 (or other component of the NMC 122) can determine whether to commit a mapping associated with a portion of a file (e.g., the previous portion of the file) based at least in part on the results of determining whether the write operation is a sequential write operation (e.g., has a sequential file access or write pattern) and determining whether there is an overflow condition associated with the track table associated with the file, in accordance with the defined network management criteria. For instance, if the detector component 206 determines that the portion of the file is associated with a sequential file access pattern and there is an overflow condition associated with the track associated with the track index that is associated with the write stream-related index value, the committer component 208 can determine that the mapping, associated with the previous portion of the file that is associated with the previous write stream value, and/or other information associated with the write transaction involving the previous write stream value, can be committed to (e.g., stored in) the data store 306. The mapping associated with the previous portion of the file can comprise information (e.g., mapping information) that can indicate or specify a storage location of the previous portion of the file in the memory component 304 or data store 306. The committer component 208 can determine that the mapping associated with the previous portion of the file can be committed, due in part to the sequential file access and the overflow condition being detected, because, from that, the committer component 208 can determine or predict that such mapping is relatively less likely to be accessed by a client device (e.g., client device 110) again (e.g., at least in the near future). In response to determining that such mapping can be committed, the committer component 208 (or other component of the NMC 122) can commit or facilitate committing the mapping and/or other information associated with the write transaction (e.g., write transaction involving the previous portion of the file) to the data store 306 (e.g., as part of a background commit operation or as otherwise desired). The track table component 204 can delete the previous write stream value associated with the previous portion of the file from that track of the track table, and can store the write stream value associated with the portion of the file in that track of the track table.

As an example of detection of an overflow condition, if the detector component 206 determines that the write stream value associated with the portion of the file satisfies the defined match criterion with respect to the total value (e.g., overflow value) that can correspond to the total number of tracks of the track table (e.g., track table 400)) and the write stream-related index value (e.g., $I_2$ 410) associated with the track index (e.g., third track index) associated with the track (e.g., third track) of the track table, the detector component 206 can determine that the portion of the file can be associated with a sequential file access pattern and can be associated with an overflow condition with respect to the track (e.g., third track) associated with the track index (e.g., third track index), which can indicate that there already is a previous write stream value, associated with a previous portion of the file, that is stored in the track (e.g., third track) of the track table. For instance, if the detector component 306 determines that the file access associated with the portion of the file is sequential and determines that there is an overflow condition with respect to the track (e.g., third track) associated with the track index (e.g., third track index)

of the track table, the NMC 122 can determine, or can determine that it can be assumed, that the previous write stream value stored in that track (e.g., at TrackTable[track-index$_x$], which can be I$_2$ 410 in this example) is no longer in use (e.g., no longer in active use by the client device or node), which can indicate that the writing of the previous portion of the file is complete, and, accordingly, can determine that the mapping associated with the previous portion of the file can be a desirable (e.g., suitable, good, wanted, or optimal) candidate for commit (e.g., background commit or flush), in accordance with the defined network management criteria.

In response to the determination that the portion of the file is associated with a sequential file access pattern and there is an overflow condition associated with the track (e.g., third track) of the track table (e.g., track table 400), the committer component 208 can determine that the mapping and/or other information, associated with the previous portion of the file that is associated with the previous write stream value, can be committed to (e.g., stored in) the data store 306 (or other desired storage location or memory of or associated with the node). In response to determining that the mapping and/or other information, associated with the previous portion of the file that is associated with the previous write stream value, can be committed, the committer component 208 can commit or facilitate committing the mapping and/or other information associated with the write transaction involving the previous portion of the file for storage in the data store 306 (or at another desired storage location or memory of or associated with the node), and such mapping can be committed to and stored in the data store 306 (or at another desired storage location or memory of or associated with the node). In some embodiments, the committer component 208 can initiate the commit (e.g., background commit) of the mapping and/or other information associated with the write transaction involving the previous portion of the file for storage in the data store 306 (or at another desired storage location or memory of or associated with the node) at or using a desired argument offset and length applicable for such previous portion of the file, such as the following example argument offset and length:

Offset = *TrackTable*[track − index] * (chunk size), and

Length = (chunk size), wherein, for this particular example argument and length, Offset can be the offset value associated with the previous portion of the file, TrackTable[track-index] can be the track index value associated with the track where the previous write stream value is stored in the track table, and Length can be the chunk or data size (e.g., the amount of data) of the previous portion of the file. The commit logic employed by the committer component 208 to perform such a commit (e.g., a proactive commit) of a mapping and/or other information associated with a file portion (e.g., previous portion of the file) typically can be faster and/or more efficient than an age-based commit that can be utilized for commits of random access files, such as described herein.

In response to committing such mapping associated with the previous portion of the file, the track table component 204 can delete the previous write stream value associated with the previous portion of the file from the track (e.g., third track) associated with the track index (e.g., third track index), and can store the write stream value (e.g., write stream value S$_2$ 418) associated with the portion of the file in the track (e.g., third track) of the track table 400.

In certain embodiments, the NMC 122 can employ a lock manager component 210 that can desirably manage data locks associated with portions of files, including data locks associated with portions of files with regard to which associated mappings have been committed for storage in the data store 306, in accordance with the defined network management criteria. The node network 108 (e.g., distributed node network system) can employ different types of data locks to protect file data being written to and/or stored in nodes (e.g., 102, 104, and/or 106) of the node network 108. The data locks can comprise an exclusive data lock (e.g., exclusive write data lock) that can allow; to a client device (e.g., 110, 114, or 118) or client (e.g., 112, 116, or 120), or other entity, exclusive access to a file, or portion (e.g., section, chunk, piece, subset, or other type of portion) thereof, stored in a node such that other client devices, clients, or entities can be denied access to the file, or portion thereof, while the exclusive data lock associated with that file, or portion thereof, is in place. Other types of exclusive data locks can include a mark lock and/or a snapshot lock, wherein the mark lock can be an exclusive lock resource that can be used to synchronize the marking and sweeping processes for a collect job engine job, and wherein the snapshot lock can be an exclusive lock that can synchronize the process of creating and deleting snapshots. The data locks also can comprise a shared data lock that can allow client devices, clients, or other entities, including those other than the client device or client who created the file, or portion thereof, to access and read (e.g., concurrently or simultaneously access and read) the file, or portion thereof. Other types of locks can include an advisory lock (e.g., higher level advisory lock associated with a client or client device), read lock, and/or other type of lock.

In some embodiments, in connection with an access operation with regard to a portion of a file, such as a write operation to write the portion of the file to a node (e.g., node 102), a client device (e.g., client device 110) can request an exclusive data lock with respect to the portion of the file from the node, which the node (e.g., employing the NMC 122, such as described herein) can generate, and/or the node can otherwise initiate (e.g., self-initiate) and generate the exclusive data lock with respect to the portion of the file. The node can associate the exclusive data lock with the portion of the file (e.g., the node can store the exclusive data lock-related information in the node or otherwise associate the exclusive data lock with the portion of the file), and can implement and enforce the exclusive data lock with respect to the portion of the file (e.g., to deny access to other client devices (e.g., client devices 114 and/or 118)), such as described herein.

With regard to a shared data lock, a node (e.g., NMC 122 of a node, such as node 102) can implement and enforce a shared data lock (e.g., by transitioning from an exclusive data lock to the shared data lock) with respect to a portion of a file stored in or associated with the node in response to a request for a shared data lock for the portion of the file (e.g., in connection with a read or other access request to read or otherwise access the portion of the file) received from a client device (e.g., client device 114 or 118) via the node (e.g., node 102) or another node (e.g., node 104 or 106), when permitted, or as otherwise determined to be appropriate (e.g., appropriate for proactive transitioning from exclusive data lock to shared data lock) by the node (e.g., by the NMC 122 of the node), in accordance with defined access management criteria, such as described herein. When a shared data lock is to be implemented, the node can associate the shared data lock with the portion of the file (e.g., the node can store the shared data lock-related information in the node(s) or otherwise associate the shared data lock with the portion of the file), and the node(s) (e.g., node 102 and/or other nodes) can implement and enforce the shared data lock with respect to the portion of the file (e.g., to allow shared access to client devices (e.g., client devices 110, 114, and/or 118)), such as described herein.

Figure 6:
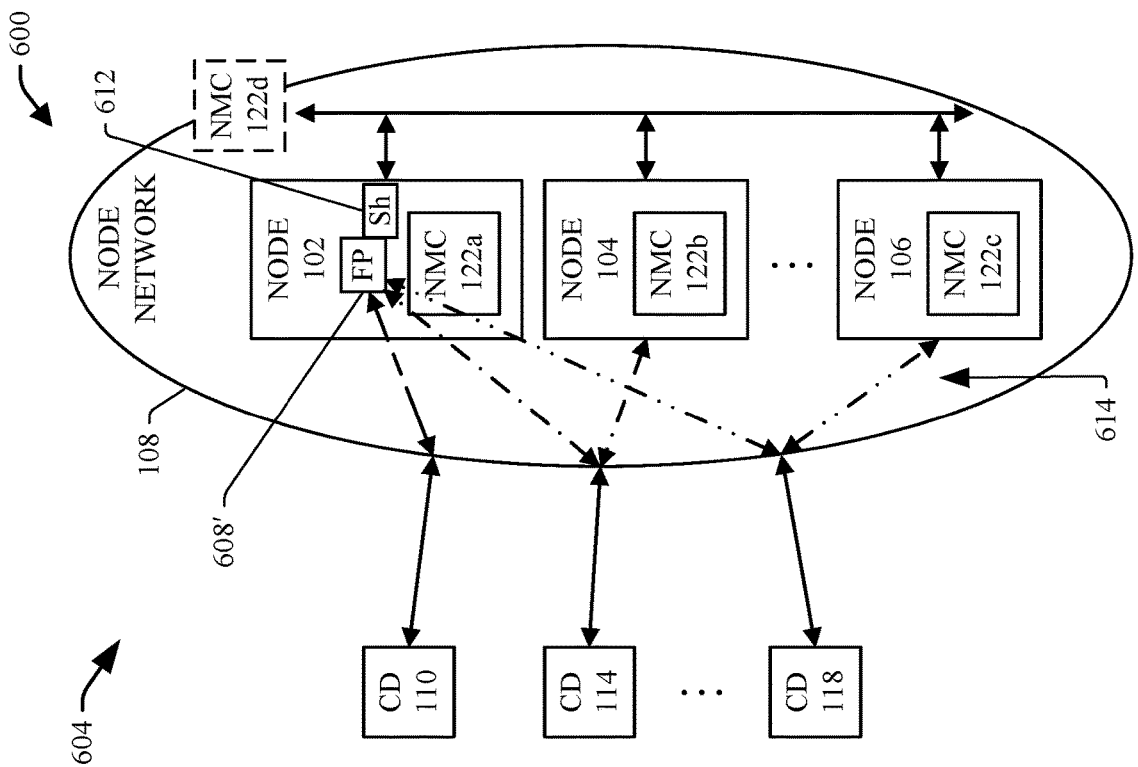
FIG. 6 depicts a block diagram of representations of data locks, such as an exclusive data lock and a shared data lock, in accordance with various aspects and embodiments of the disclosed subject matter.
Figure 6:
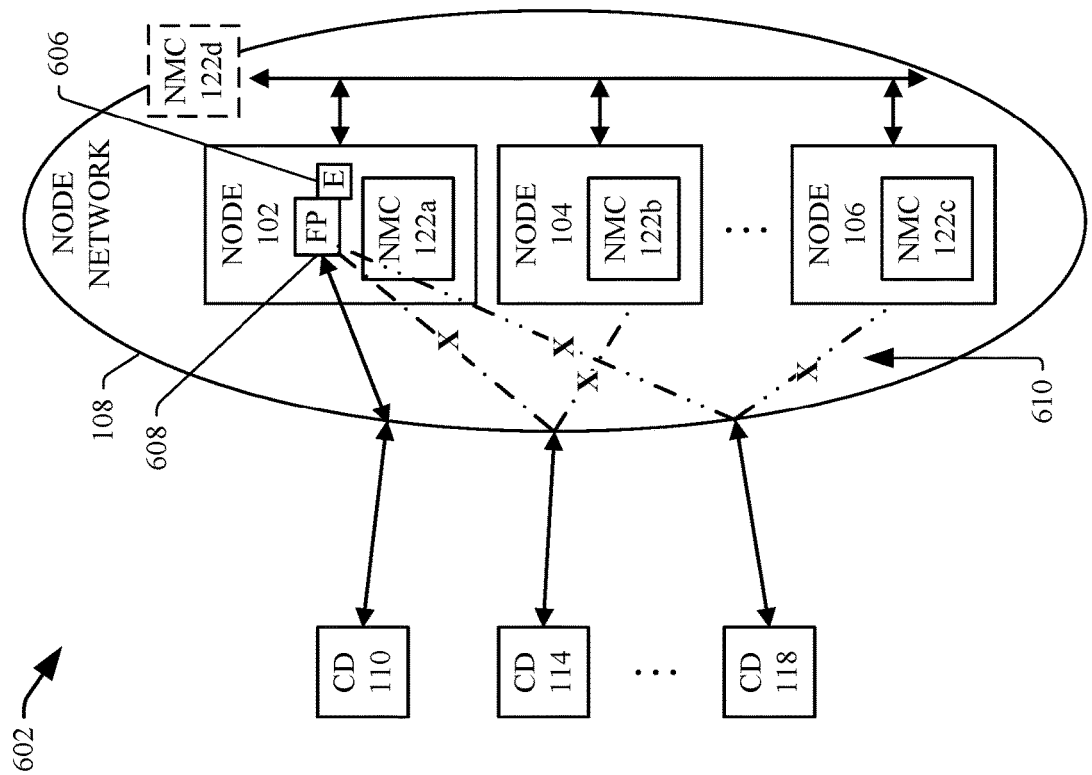

Referring briefly to FIG. 6 (along with FIGS. 1-4), FIG. 6 depicts a block diagram of representations of data locks 600, such as an exclusive data lock and a shared data lock, in accordance with various aspects and embodiments of the disclosed subject matter. The representations of data locks 600 can comprise a representation of an exclusive data lock 602 and a representation of a shared data lock 604. With regard to the representation of the exclusive data lock 602, if the client device 110 has an exclusive data lock (E) 606 with regard to a portion of a file 608 (file portion (FP) (e.g., if the exclusive data lock 606 is associated with the portion of the file 608) during a write of the portion of the file 608 to the node 102, the NMC 122 can deny other client devices, such as client device 114 and client devices 118, access to the portion of the file 608, as indicated or represented at reference numeral 610 (and the "X" associated with the line associated with CD 114 and node 102, the "X" associated with the line associated with CD 114 and node 104, the "X" associated with the line associated with CD 118 and node 102, and the "X" associated with the line associated with CD 118 and node 106). For instance, if the client device 114 is connected to the node 104 (or node 102 or another node), and if there is an exclusive data lock 606 associated with the portion of the file 608, the exclusive data lock 606 can be enforced (e.g., by the NMC 122 or other component of a node) to deny the client device 114 access to the portion of the file 608 via the node 104 (or node 102 or another node). Also, if the client device 118 is connected to the node 106 (or node 102 or another node), and if there is an exclusive data lock 606 associated with the portion of the file 608, the exclusive data lock 606 can be enforced (e.g., by the NMC 122 or other component of a node) to deny the client device 118 access to the portion of the file 608 via the node 106 (or node 102 or another node).

With regard to the representation of the shared data lock 604, if the NMC 122 associates the shared data lock (Sh) 612 with the portion of the file 608' stored on the node 102 (e.g., after writing of the portion of the file 608 to the node 102 is determined to be complete, and the lock manager component 210 transitions the exclusive data lock 606 to the shared data lock 612), the NMC 122 can allow (e.g., grant) access (e.g., concurrent or simultaneous access) to the portion of the file 608' to client devices, such as client device 110, client device 114, and/or client devices 118, as indicated or represented at reference numeral 614 (and the line (with no "X") associated with CD 114 and node 102, the line (with no "X") associated with CD 114 and node 104, the line (with no "X") associated with CD 118 and node 102, and the line (with no "X") associated with CD 118 and node 106). For example, if the client device 110 is connected to the node 102 (or another node), if the client device 114 is connected to the node 104 (or node 102 or another node), and/or if the client device 118 is connected to the node 106 (or node 102 or another node), and if there is a shared data lock 612 associated with the portion of the file 608', the shared data lock 612 can be employed or enforced (e.g., by the NMC 122 or other component of a node) to allow shared access (e.g., shared, concurrent, or simultaneous access) to the portion of the file 608' such that, if desired, the client device 110 can gain (or maintain) access to the portion of the file 608' via the node 102 (or another node), the client device 114 can gain access to the portion of the file 608' (e.g., can read, copy, or otherwise access the portion of the file 608') via the node 104 (or node 102 or another node), and/or the client device 118 can gain access to the portion of the file 608' via the node 106 (or node 102 or another node).

As disclosed, the process of revoking an exclusive data lock from a client and providing a shared data lock for another client with respect to a file, or portion thereof, can have an undesirably significant latency cost. In a number of types of situations, it can be desirable to transition an exclusive data lock associated with a portion of a file to a shared data lock when possible (e.g., after the portion of the file has been written to a node) to enable other client devices and associated clients, or other entities, to access and read the portion of the file. As also disclosed, existing approaches (e.g., relying on a time out of a timer to release the exclusive data lock, advising customers to target clients that desire to access certain files to the same node, or relying on the undesirably costly three-way lock reclaim via a coordinator) for releasing or changing an exclusive data lock to implement a shared data lock with respect to a file, or portion thereof, can be undesirable, costly (e.g., an undesirable amount of latency), and/or otherwise inefficient.

The lock manager component 210 can overcome the deficiencies of existing approaches for handling data locks, as the lock manager component 210 can desirably (e.g., suitably, efficiently, enhancedly, or optimally) manage data locks associated with portions of files, including data locks associated with portions of files with regard to which associated mappings have been committed for storage in the data store 306, in accordance with the defined network management criteria. As an example of data lock management, if the NMC 122 determines that a previous portion of a file is associated with (e.g., part of) a sequential write operation (e.g., a sequential write operation that has a sequential write pattern) and there is the overflow condition associated with the track index and associated track of the table where the previous write stream value associated with the previous portion of the file is stored, and determines that the mapping and/or other information associated with the previous portion of the file can be committed for storage in the data store 306, and such mapping and/or other information is committed to and stored in the data store 306 (e.g., by or as facilitated by the committer component 208), the lock manager component 210) can determine that an exclusive data lock associated with the previous portion of the file can be transitioned (e.g., proactively or dynamically transitioned, switched, changed, or downgraded) to a shared data lock with respect to the previous portion of the file, in accordance with the defined network management criteria. In response to determining that the exclusive data lock can be transitioned to a shared data lock with respect to the previous portion of the file, the lock manager component 210 can transition (e.g., proactively transition, switch, change, or downgrade) the exclusive data lock to the shared data lock with respect to the previous portion of the file, and the lock manager component 210) can associate or implement the shared data lock with or for the previous portion of the file. As a result, client devices (e.g., client device(s) 110, 114, and/or 118) can have access (e.g., can concurrently have access) to the mapping and/or other information associated with the previous portion of the file, and/or can have access to the previous portion of the file, in the memory component 304 and/or data store 306.

The lock manager component 210 also can manage the data locks associated with portions of files such that, if a mapping associated with a portion of a file is still active and has not been committed for storage in the data store 306, the lock manager component 210 can desirably maintain and implement (e.g., enforce or utilize) an exclusive data lock with respect to the portion of the file where only the client device (e.g., client device 110) that is performing the write of the portion of the file to the node (e.g., node 102) can have access to the portion of the file at the node.

With the exclusive data lock in place for such portion of the file, if another client device (e.g., client device(s) 114 or 118) or other device attempts or requests to read the portion of the file from the node network 108 (e.g., via another node, such as node 104 or node 106), the lock manager component 210 can deny the other client device (e.g., client device(s) 114 or 118) or other device access to the portion of the file and prevent the other client device or other device from reading the portion of the file from the node network 108 based at least in part on the exclusive data lock being associated with the portion of the file (or the lock manager component 210 can at least can make the other client device or other device wait until the exclusive data lock can be (e.g., is permitted to be) transitioned to and has been transitioned to the shared data lock with respect to the portion of the file before allowing the other client device or other device to read the portion of the file from the node network 108).

In some instances, a file can transition between having a random file access pattern and a sequential file access pattern. In certain embodiments, the NMC 122 can manage marking or selecting the file access mode (e.g., random access mode or sequential access mode) associated with a file, if and as the file changes between random file access pattern and sequential file access pattern over time (e.g., random to sequential, or sequential to random). For instance, the NMC 122 can transition (e.g., switch or change) a file between random access mode and sequential access mode based at least in part on the type of file access pattern (e.g., random file access pattern or sequential file access pattern) detected by the NMC 122 (e.g., by the detector component 206), in accordance with the defined network management criteria.

As an example, at a first time period, the detector component 206 can determine or detect that a file is associated with a random file access pattern based at least in part on the detector component 206 determining that a write stream value associated with a portion of a file does not match a write stream-related index value associated with the track table associated with the file, such as described herein. In response, the NMC 122 (e.g., the detector component 206 or other component of the NMC 122) can mark the file as being in a random access mode and/or can assign a random access mode label (e.g., mark), flag, or tag (e.g. as metadata) to the file, where the file can be associated with the random access mode label, flag, or tag to indicate that the file is in or associated with the random access mode.

During a second time period, if the detector component 206 determines or detects a sequential file access (e.g., using the techniques described herein) across portions of the file being written to the node (e.g. node 102), for example, consecutively, such that all, or at least a desired portion, of the tracks (e.g., tracks associated with track indexes having write stream-related index values $I_0$ 404, $I_1$ 406, $I_2$ 408 up through $I_{(table\ size-1)}$ 410, or a desired portion thereof) of the track table (e.g., track table 400) associated with those portions of the file are associated with sequential file access, the detector component 206 can determine that the file can be transitioned from being associated with a random file access (e.g., random access mode) to being associated with a sequential file access (e.g., sequential access mode). If, at a third time period, the detector component 206 detects a random file access pattern associated with another portion of the file being written to the node, the detector component 206 can determine that the file can be transitioned (again) from being associated with a sequential file access (e.g., sequential access mode) to a random file access (e.g., random access mode).

The nodes (e.g., 102, 104, and/or 106), and associated NMCs (e.g., 122*a*, 122*b*, 122*c*, and/or 122*d*), can communicate, coordinate, and/or synchronize with each other with regard to determinations regarding sequential file access or random file access associated with files, or portions thereof, data lock transition determinations or predictions, and/or corresponding network management criteria.

With further regard to the node 102 (e.g., of FIG. 3), in accordance with various embodiments, in addition to the NMC 122 (e.g., 122*a*), the write component 302, memory component 304, and data store 306, the node 102 can comprise a mapper component 308, read component 310, interface component 312, service server 314, a processor component 316, network component 318, interconnect component 320, controller component 322, and/or other desired components.

The mapper component 308 can generate respective mappings associated with respective portions of respective files. With regard to a portion of a file, the mapper component 308 can generate a mapping associated with the portion of the file, where the mapping can comprise information (e.g., mapping information) that can indicate or specify a storage location of the portion of the file in the memory component 304 or data store 306. A client device (e.g., 110, 114, or 118) can access the portion of the file from the node 102 (e.g., the memory component 304 or data store 306 of the node 102) using the mapping associated with the portion of the file.

The read component 310 can facilitate (e.g., enable) a client device(s) (e.g., 110, 114, or 118) or other device(s) to read a file(s), or a portion(s) of a file(s), from the memory component 304 or data store 306 of the node 102, and the node 102 can provide the file(s), or portion(s) of the file(s), to the client device(s) or other device(s) in response to a read request received by the read component 310 from the client device(s) (e.g., when the client device(s) has authorization and/or is permitted to access (e.g., via a shared data lock or no data lock) the file(s), or portion(s) thereof (e.g., by the NMC)).

The interface component 312 can comprise various interfaces, such as, for example, network interfaces, application programming interfaces (APIs), interconnect interfaces, communication interfaces, a display screen, display interfaces, audio interfaces, haptic interface, and/or other desired interfaces, to facilitate (e.g., enable) transmitting or presenting information to a user or a device (e.g., service server, another node, or client or communication device, such as a computer, server, or mobile (e.g., smart) phone), or receiving information (e.g., query or request for a service: or request for information) from a service server or the NMC.

The service server 314 can facilitate handling client requests received from communication devices and provisioning services for the communication devices in response to the client requests. In some embodiments, the service server 314 can be an SMB server that can employ a desired SMB protocol to facilitate establishing SMB sessions. For example, the service server 314 can employ the desired SMB protocol to facilitate servicing client requests with regard to data stored on the node. In other embodiments, the service server 314 can be or can comprise a different type of service server, such as an NFS server that can comprise a distributed file system and can employ an NFS protocol that can enable the sharing of file directories and files with clients over the node network. Users (e.g., clients) can, for example, add files to a shared file directory, and those files are able to be shared with other users who have access to that file directory. It is to be appreciated and understood that, in other embodiments, the node 102 can comprise one or more other types of service servers, in addition to or as an alternative to service server 314.

The processor component 316 can include can work in conjunction with the other components (e.g., NMC 122*a*, write component 302, memory component 304, data store 306, mapper component 308, read component 310, interface component 312, service server 314, network component 318, interconnect component 320, controller component 322, and/or another component) to facilitate performing the various functions of the node 102. The processor component 316 can employ one or more processors (e.g., one or more CPUs), microprocessors, or controllers that can process information relating to data (e.g., file data or other data), files, file systems, communication connection operations, read operations, write operations, data storage operations, mappings associated with files or portions thereof, commit operations (e.g., to commit mappings or other information associated with files or portions thereof), file access modes (e.g., sequential access mode or random access mode), file access patterns (e.g., sequential file access pattern or random file access pattern), track tables, write stream values, write stream-related index values, data locks, data lock transitions, data or file search operations, nodes, network of nodes, service servers, clients or other entities, communication (e.g., client or other communication) devices, network addresses, interface identifiers, node identifiers, applications, operating systems, hardware or virtual platforms, characteristics associated with applications, preferences (e.g., user or client preferences), services, hash values, metadata, parameters, traffic flows, policies, defined network management criteria, algorithms (e.g., network management algorithms, hash algorithms, data compression algorithms, data decompression algorithms, and/or other algorithm), protocols, interfaces, tools, and/or other information, to facilitate operation of the node 102, and control data flow between the node 102 and other components (e.g., another node(s), NMC, communication device, service server, file system, or other component) associated with the node 102.

The network component 318 can comprise network sub-components (e.g., Ethernet component (e.g., Ethernet ports and associated Ethernet sub-components), wireless communication connection component, or other network sub-component) that can enable the node 102 to network and communicate with one or more other nodes (e.g., nodes associated with a cluster), the NMC (e.g., NMC(s) of another node(s)), communication devices, service servers (e.g., service server(s) of another node(s)), and/or other components or devices. The network can employ IP for node-to-node communication between the node 102 and other nodes (e.g., other nodes associated with the cluster) associated with the node 102. For instance, a cluster of nodes of the storage system can comprise a back-end network, which can act as a backplane for the cluster, wherein can enable isolating node-to-node communication (e.g., between the node 102 and other nodes associated with the cluster) to a private, high-speed, low-latency network. The node 102 can support and utilize desired network communication protocols to communicate with other components or devices in a communication network (e.g., Internet, intranet, customer network, or other type of communication network), wherein the network communication protocols can comprise, for example, NFS, pNFS, SMB, CIFS, HCFS, HDFS, FTP, OpenStack Swift, HTTP, and/or other desired network communication protocols. The network component 318 also can comprise IP functionality that can allow the network component 318 and associated storage system to utilize communication protocols, such as IPv4 and IPV6, and be fully integrated with IPv4 and IPV6 environments. The node 102 can be associated with (e.g., assigned) respective IP addresses, including virtual IP addresses, that can be employed to facilitate enabling the node 102 to connect to client devices, other nodes, service servers, the NMC, and/or other components or devices. If the node 102 is offline for any reason, the IP addresses (e.g., virtual IP addresses) of the node 102 can be migrated (e.g., moved or transferred) to another node associated with the cluster (e.g., another node associated with a network of the cluster) to facilitate redistributing client devices to other nodes associated with the cluster if the node 102 is offline.

The interconnect component 320 can be associated with the network component 318 and/or other components to facilitate providing desired interconnects to the network component 318 and/or the other components. For instance, in some embodiments, a portion of the interconnect component 320 can be part of the network component 318. The interconnect component 320 can comprise various types of interconnects (e.g., interconnect sub-components) that can be utilized to connect the node 102 to other nodes of the cluster of nodes, connect various components (e.g., NMC 122*a*, write component 302, memory component 304, data store 306, mapper component 308, read component 310, interface component 312, service server 314, processor component 316, network component 318, controller component 322, and/or another component) of the node 102, or connect the node 102 to other components (e.g., another node(s), NMC, client or communication device, service server, file system, or other component) of or associated with the storage system. The interconnects can comprise, for example, Ethernet interconnects or other low-latency interconnects (e.g., low-latency InfiniBand interconnects) that can be utilized to provide desirably fast and low-latency connections between respective components of or associated with the node 102. For instance, the memory component 304 (e.g., memory cache of the memory component 304) can communicate via a desirably fast (e.g., low-latency) interconnect (e.g., internal interconnect) of the interconnect component 320 to another memory component(s) of another node(s) of the cluster of nodes to desirably communicate or otherwise make available the data in the memory component 304 to the other memory component(s) or to access data in the other memory component(s), wherein such interconnect can have a significantly lower latency than accessing a hard disk drive of a node. The interconnect component 320 also can comprise desirably fast interconnects between different memory sub-components (e.g., different caches) of the memory component 304.

The controller component 322 can be or can comprise a disk controller that can enable the processor component 316, or portion thereof, to communicate with the data store 306 (e.g., a hard disk of the data store 306) or other type of storage media or storage drive (e.g., disk drive) of or associated with the node 102. The controller component 322 also can provide or facilitate providing an interface between the hard disk or disk drive and other components of the node 102.

With further regard to the memory component 304, the memory component 304 can include one or more volatile or non-volatile memory sub-components (e.g., cache memory) that can be utilized to store data, such as the various types of data disclosed herein. The memory sub-components of the memory component 304 can comprise, for example, random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), non-volatile RAM (NVRAM), and/or other desired type of memory. One or more memory sub-components can be one or more caches.

With further regard to the data store 306, the data store 306 can store data structures (e.g., user data, metadata), code structure(s) (e.g., modules, objects, hashes, classes, procedures) or instructions, information relating to data (e.g., file data or other data), files, file systems, communication connection operations, read operations, write operations, data storage operations, mappings associated with files or portions thereof, commit operations (e.g., to commit mappings or other information associated with files or portions thereof), file access modes (e.g., sequential access mode or random access mode), file access patterns (e.g., sequential file access pattern or random file access pattern), track tables, write stream values, write stream-related index values, data locks, data lock transitions, data or file search operations, nodes, network of nodes, service servers, clients or other entities, communication (e.g., client or other communication) devices, network addresses, interface identifiers, node identifiers, applications, operating systems, hardware or virtual platforms, characteristics associated with applications, preferences (e.g., user or client preferences), services, hash values, metadata, parameters, traffic flows, policies, defined network management criteria, algorithms (e.g., network management algorithms, hash algorithms, data compression algorithms, data decompression algorithms, and/or other algorithm), protocols, interfaces, tools, and/or other information, to facilitate controlling operations associated with the node 102. The data store 306 can comprise volatile and/or non-volatile memory, such as described herein. In an aspect, the processor component 316 can be functionally coupled (e.g., through a memory bus) to the data store 306 in order to store and retrieve information desired to operate and/or confer functionality, at least in part, to the NMC 122*a*, write component 302, memory component 304, data store 306, mapper component 308, read component 310, interface component 312, service server 314, processor component 316, network component 318, interconnect component 320, controller component 322, and/or another component, and/or substantially any other operational aspects of the node 102.

The disclosed subject matter (e.g., the systems, methods, and techniques described herein), by employing an NMC and the techniques described herein that can desirably (e.g., suitably, efficiently, enhancedly, or optimally) manage committing of mappings and transitions (e.g., proactive transitions, changes, or downgrades) of exclusive data locks to shared data locks with respect to portions of files in a node network (e.g., a distributed node network), can provide a number of advantages over existing techniques relating to mappings and data locks associated with files. For instance, the NMC and the techniques described herein can desirably reduce overhead (e.g., node or node network overhead) associated with mappings (e.g., active mappings) associated with files, or portions thereof, and can reduce costs (e.g., time, latency, resource, performance, financial, or other costs) to nodes, servers, clients, and client devices with regard to such mappings, as compared to existing systems, methods, and techniques for handling mappings associated with files. Also, the NMC and the techniques described herein can desirably reduce latency costs associated with changing from an exclusive data lock to a shared data lock for a portion of a file by proactively transitioning from an exclusive data lock to a shared data lock with respect to a portion of a file when it is determined to be appropriate or possible (e.g., when a sequential write pattern is detected and it is determined that the writing of the portion of the file is complete), as compared to existing systems, methods, and techniques, such as waiting for a timer associated with an exclusive data lock to elapse before transitioning from the exclusive data lock to a shared data lock for a portion of a file, advising customers to target clients that desire to access certain files to the same node, or relying on an undesirably costly three-way lock reclaim via a coordinator. The NMC and the techniques described herein also can desirably enhance (e.g., improve, increase, or optimize) performance of a network of nodes with regard to processing of data (e.g., file data or other data), and making data available or providing data to clients, as compared to existing systems, methods, and techniques.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
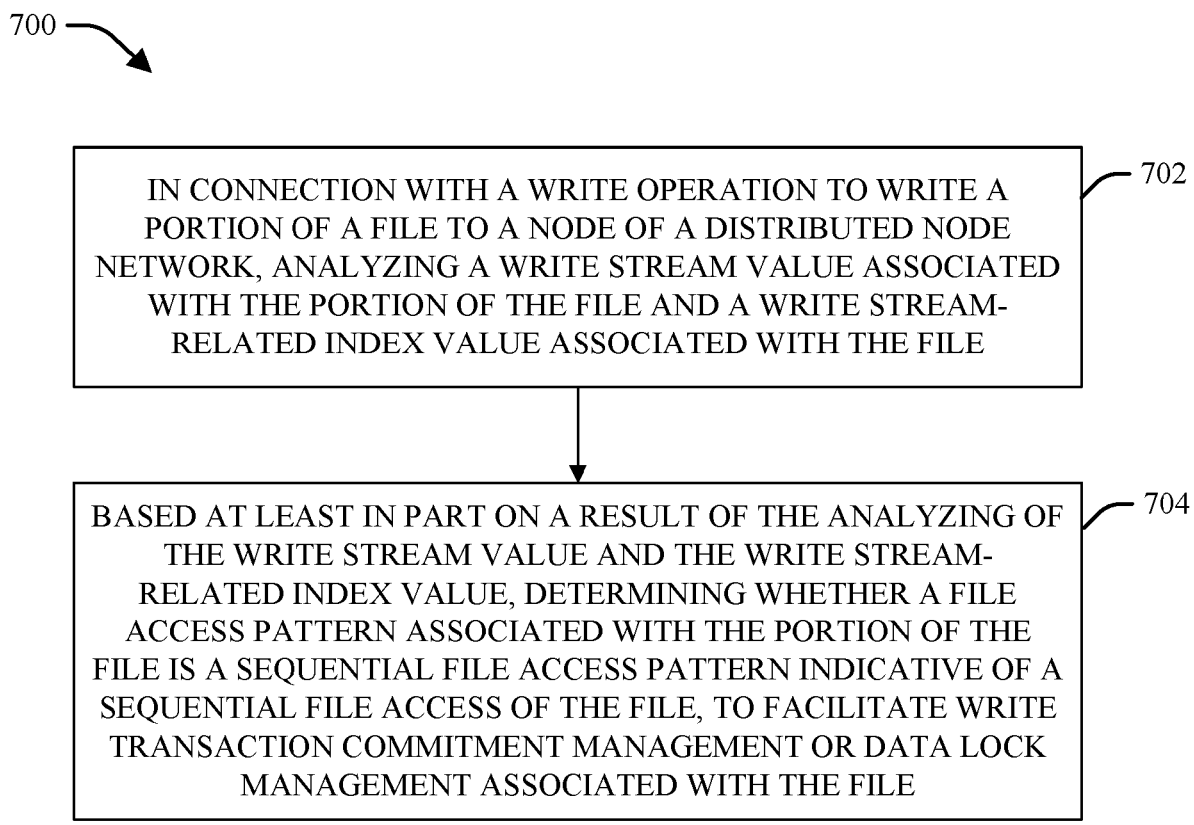
FIG. 7 illustrates a flow chart of an example method that can desirably determine whether a file access pattern associated with a portion of a file is sequential or random to facilitate write transaction commitment management or data lock management associated with the file, in accordance with various aspects and embodiments of the disclosed subject matter.
Figure 8:
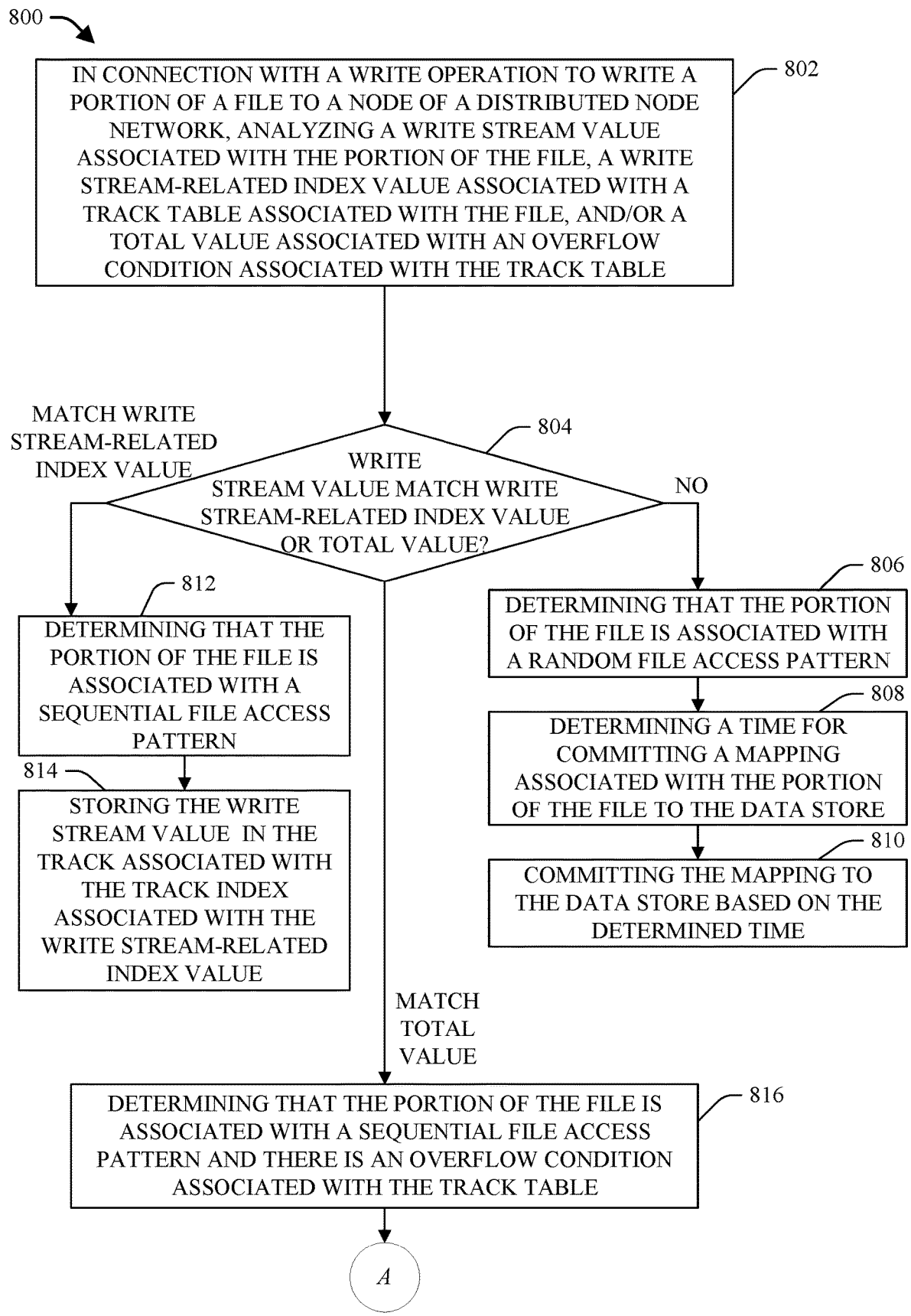
FIGS. 8 and 9 present a flow chart of another example method that can desirably determine whether a file access pattern associated with a portion of a file is sequential or random to facilitate write transaction commitment management or data lock management associated with the file, in accordance with various aspects and embodiments of the disclosed subject matter.
Figure 9:
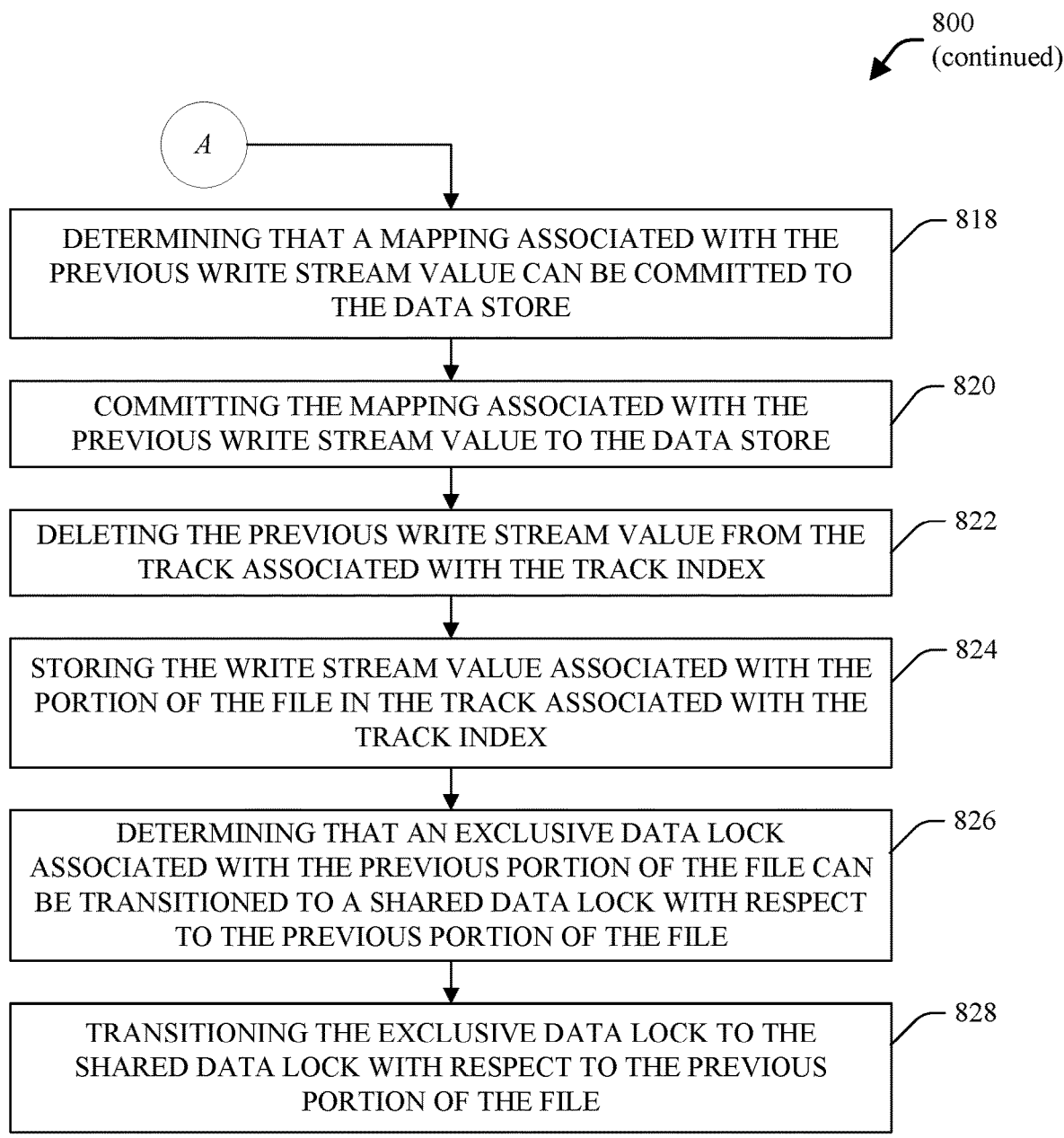

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 that can desirably (e.g., suitably, efficiently, or optimally)

determine (e.g., detect or identify) whether a file access pattern associated with a portion of a file is sequential or random to facilitate write transaction commitment management or data lock management associated with the file, in accordance with various aspects and embodiments of the disclosed subject matter. The method 700 can be employed by, for example, a system comprising the NMC, a processor component (e.g., of or associated with the NMC), and/or data store (e.g., of or associated with the NMC and/or the processor component).

At 702, in connection with a write operation to write a portion of a file to a node of a distributed node network, a write stream value associated with the portion of the file and a write stream-related index value associated with the file can be analyzed. A track table, comprising a desired number of tracks associated with track indexes, can be associated with the file, and the NMC can store and/or associate respective write stream values (e.g., respective write stream-related index values) in and/or with respective tracks associated with respective track indexes in the track table. The NMC can determine or generate the write stream value associated with the portion of the file as a function of an offset and data chunk size associated with the portion of the file, such as described herein. The NMC also can similarly determine or generate the respective write stream-related index values that can be associated with (e.g., stored in) the respective tracks associated with the respective indexes of the track table. The NMC can analyze the write stream value associated with the portion of the file and the write stream-related index value associated with the file.

At 704, based at least in part on a result of the analyzing of the write stream value and the write stream-related index value, a determination can be made regarding whether a file access pattern associated with the portion of the file is a sequential file access pattern indicative of a sequential file access of the file, to facilitate write transaction commitment management or data lock management associated with the file. The NMC can determine whether the file access pattern (e.g., write pattern) associated with the portion of the file is a sequential file access pattern indicative of a sequential file access of the file or a random file access pattern indicative of a random file access of the file, based at least in part on a result of the analyzing. For instance, the results of the analysis of the write stream value and the write stream-related index value can enable the NMC to facilitate determining whether the write stream value matches the write stream-related index value, determining whether the file access pattern associated with the portion of the file is sequential or random, determining whether there is an overflow condition associated with the track table, determining whether a mapping associated with another portion of the file (e.g., associated with a track in the track table) is to be committed, and/or determining whether an exclusive data lock associated with the other portion of the file is to be transitioned to a shared data lock, such as described herein.

FIGS. 8 and 9 present a flow chart of another example method 800 that can desirably (e.g., suitably, efficiently, or optimally) determine (e.g., detect or identify) whether a file access pattern associated with a portion of a file is sequential or random to facilitate write transaction commitment management or data lock management associated with the file, in accordance with various aspects and embodiments of the disclosed subject matter. The method 800 can be employed by, for example, a system comprising the NMC, a processor component (e.g., of or associated with the NMC), and/or data store (e.g., of or associated with the NMC and/or the processor component).

At 802, in connection with a write operation to write a portion of a file to a node of a distributed node network, a write stream value associated with the portion of the file, a write stream-related index value associated with a track table associated with the file, and/or a total value associated with an overflow condition associated with the track table can be analyzed. For each file, including the file, the NMC can create a track table that can be associated with the file and can comprise a desired number of tracks associated with track indexes. The NMC can store and/or associate respective write stream values (e.g., respective write stream-related index values) in and/or with respective tracks associated with respective track indexes in the track table. The NMC can determine or generate the write stream value associated with the portion of the file as a function of an offset and data chunk size associated with the portion of the file, such as described herein.

The NMC also can similarly determine or generate the respective write stream-related index values that can be associated with (e.g., stored in) the respective tracks associated with the respective indexes of the track table. In certain embodiments, the NMC also can determine a total value (e.g., an overflow value) associated with an overflow condition associated with the track table. The NMC can determine such total value (e.g., overflow value) as a function of the write stream-related index value and a value associated with (e.g., representing or corresponding to) the number of tracks of the track table. In some embodiments, the total value can represent or correspond to (e.g., can be equal to the sum of) the write stream-related index value and the value associated with the number of tracks (e.g., total value=TrackTable[track-index]+number of tracks).

The NMC can analyze the write stream value associated with the portion of the file, the write stream-related index value associated with the track table (e.g., associated with a track index and associated track of the track table) associated with the file, and/or the total value associated with (e.g., which can be indicative of or can correspond to) the overflow condition associated with the track table. For instance, as part of the analysis, the NMC can compare the write stream value to the write stream-related index value and/or the total value associated with an overflow condition associated with the track table.

At 804, a determination can be made regarding whether the write stream value satisfies a defined match criterion with respect to the write stream-related index value or the total value associated with the overflow condition based at least in part on the result of the analyzing and a defined match criterion relating to write stream values. The NMC can determine whether the write stream value satisfies the defined match criterion with respect to (e.g., determine whether the write stream value matches) the write stream-related index value or the total value associated with the overflow condition based at least in part on the result of the analyzing (e.g., the comparing) and the defined match criterion.

If it is determined that the write stream value does not satisfy the defined match criterion with respect to the write stream-related index value or the total value associated with the overflow condition, at 806, a determination can be made that the portion of the file is associated with a random file access pattern. If the write stream value does not satisfy the defined match criterion with respect to the write stream-related index value or the total value, this can indicate that the portion of the file is associated with a random file access pattern (e.g., the portion of the file is part of a random file access operation). Accordingly, if the NMC determines that the write stream value does not satisfy the defined match criterion with respect to (e.g., does not match) the write stream-related index value or the total value associated with the overflow condition, the NMC can determine that the portion of the file is associated with a random file access pattern.

At 808, a time for committing a mapping associated with the portion of the file to the data store can be determined based at least in part on an amount of time that has elapsed since the mapping was last utilized (e.g., an age of the mapping since it was last utilized). At 810, the mapping can be committed to the data store based at least in part on the determined time. If the NMC determines that the portion of the file is associated with a random file access pattern, the NMC can determine a time for committing the mapping associated with the portion of the file to the data store based at least in part on the amount of time that has elapsed since the mapping was last utilized (e.g., by a client device or other entity). The NMC can commit or facilitate committing the mapping and/or other information associated with the write transaction (e.g., write transaction involving the portion of the file) to the data store at the determined time for committing.

Referring again to reference numeral 804, if, at 804, it is determined that the write stream value satisfies the defined match criterion with respect to the write stream-related index value, at 812, a determination can be made that the portion of the file is associated with a sequential file access pattern. If the write stream value satisfies the defined match criterion with respect to (e.g., matches) the write stream-related index value, this can indicate that the portion of the file is associated with a sequential file access pattern (e.g., the portion of the file is part of a sequential file access operation). Accordingly, if the NMC determines that the write stream value satisfies the defined match criterion with respect to the write stream-related index value, the NMC can determine that the portion of the file is associated with a sequential file access pattern.

At 814, the write stream value can be stored in the track associated with the track index that is associated with the write stream-related index value. If the NMC determines that the portion of the file is associated with a sequential file access pattern, the NMC can store the write stream value in the track in the track table stored in the memory, wherein the track in which the write stream value is stored can be the track that is associated with the track index that is associated with (e.g., corresponds to or is representative of) the write stream-related index value.

Referring again to reference numeral 804, if, at 804, it is determined that the write stream value satisfies the defined match criterion with respect to the total value associated with the overflow condition, at 816, a determination can be made that the portion of the file is associated with a sequential file access pattern and there is an overflow condition associated with the track table. If the write stream value satisfies the defined match criterion with respect to (e.g., matches) the total value associated with the overflow condition, this can indicate that the portion of the file is associated with a sequential file access pattern (e.g., the portion of the file is part of a sequential file access operation) and also can indicate that there is an overflow condition associated with the track associated with the track index that is associated with the write stream-related index value. That is, the overflow condition can indicate that a previous write stream value, which can be or correspond to a previous portion (e.g., previously written portion) of the file, is stored in the track associated with the track index that is associated with the write stream-related index value. Accordingly, if the NMC determines that the write stream value satisfies the defined match criterion with respect to the total value associated with the overflow condition, the NMC can determine that the portion of the file is associated with a sequential file access pattern and also can determine that there is an overflow condition associated with the track associated with the track index that is associated with the write stream-related index value. At this point, the method 800 can proceed to reference point A, where the method 800 can continue from reference point A, as depicted in FIG. 9.

At 818, a determination can be made that a mapping associated with the previous write stream value can be committed to the data store. At 820, the mapping associated with the previous write stream value can be committed to the data store. If the NMC determines that the portion of the file is associated with a sequential file access pattern and there is an overflow condition associated with the track associated with the track index that is associated with the write stream-related index value, the NMC can determine that the mapping associated with the previous write stream value can be committed to (e.g., stored in) the data store. The NMC can commit or facilitate committing the mapping and/or other information associated with the write transaction (e.g., write transaction involving the previous portion of the file) to the data store, such as described herein.

At 822, the previous write stream value can be deleted from the track associated with the track index. At 824, the write stream value associated with the portion of the file can be stored in the track associated with the track index. In response to committing the mapping associated with the previous write stream value to the data store, the NMC can delete the previous write stream value associated with the previous portion of the file from the track, of the track table, associated with the track index. The NMC can store the write stream value associated with the portion of the file in the track associated with the track index.

At 826, a determination can be made that an exclusive data lock associated with the previous portion of the file can be transitioned to a shared data lock with respect to the previous portion of the file. For example, in response to committing the mapping and/or other information associated with the write transaction involving the previous portion of the file to the data store, and/or in response to determining that the file access pattern is sequential and there is the overflow condition associated with the track, the NMC can determine that the exclusive data lock can be transitioned (e.g., proactively transitioned, switched, changed, or downgraded) to a shared data lock with respect to the previous portion of the file.

At 828, the exclusive data lock can be transitioned to the shared data lock with respect to the previous portion of the file. In response to determining that the exclusive data lock can be transitioned to a shared data lock with respect to the previous portion of the file, the NMC can transition (e.g., proactively transition, switch, change, or downgrade) the exclusive data lock to the shared data lock with respect to the previous portion of the file.

Figure 10:
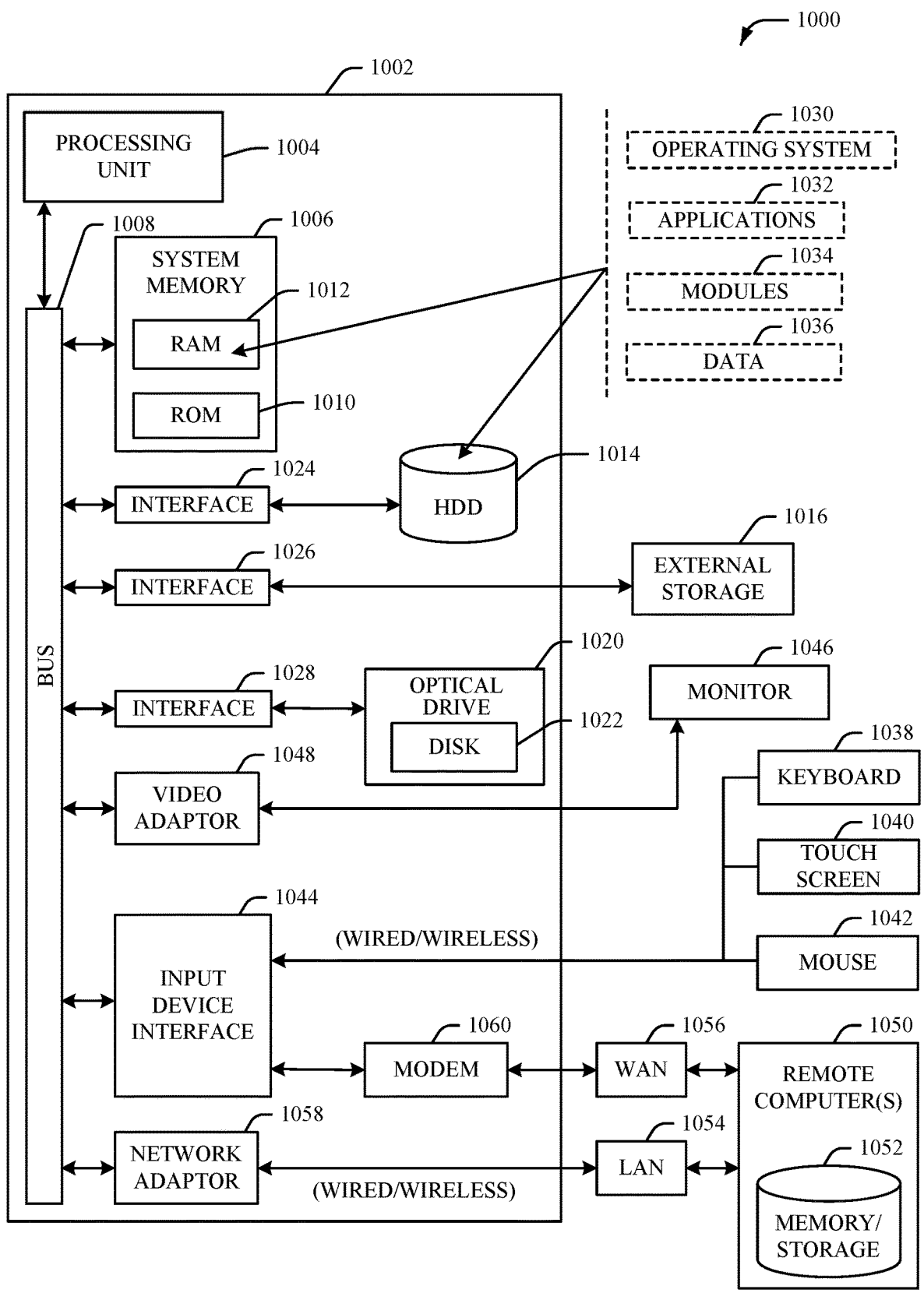
FIG. 10 illustrates an example block diagram of an example computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory." herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out: anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHZ radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors: single-processors with software multithread execution capability: multi-core processors: multi-core processors with software multithread execution capability: multi-core processors with hardware multithread technology: parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), Internet of things (IOT) device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A: X employs B: or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., node, cluster, network, NMC, detector component, mapper component, committer component, lock manager component, interfaces, processor component, data store, memory component, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
in connection with a write operation to write a second portion of a file to a node of a distributed node network, analyzing, by a system comprising at least one processor, a second write stream value associated with the second portion of the file, a write stream-related index value associated with a track of a group of tracks associated with the file, and a total value that is determined based on the write stream-related index value and a value indicative of a number of tracks of the group of tracks;
based on a result of the analyzing of the second write stream value, the write stream-related index value, and the total value, determining, by the system, whether a file access pattern associated with the second portion of the file is a sequential file access pattern indicative of a sequential file access of the file, to facilitate write transaction commitment management or data lock management associated with the file;
based on the result indicating that the second write stream value satisfies a defined match criterion with regard to the total value, determining, by the system, that the file access pattern associated with the second portion of the file is the sequential file access pattern and there is an overflow condition associated with the track, wherein the overflow condition indicates that a first write stream value associated with a first portion of the file is stored in the track associated with the write stream-related index value; and
based on determining that the file access pattern is the sequential file access pattern and there is the overflow condition, determining, by the system, that a mapping is to be committed and stored in a data store, wherein the mapping is associated with the first portion of the file, the first write stream value, and the sequential file access pattern, and wherein the first write stream value is deleted from the track and the second write stream value is stored in the track.

2. The method of claim 1, further comprising:
determining, by the system, the second write stream value associated with the second portion of the file based on an offset value and a data size of the second portion of the file;
mapping, by the system, the second write stream value on to a track index based on the second write stream value and the number of tracks of the group of tracks, wherein the group of tracks comprises the track that is associated with the track index; and
storing, by the system, the second write stream value in the track in a memory based on the mapping.

3. The method of claim 2, further comprising:
storing, by the system, respective write stream-related index values in respective tracks associated with respective track indexes in the memory, wherein the respective write stream-related index values comprise the write stream-related index value, and wherein the respective track indexes, comprising the track index, are associated with the file.

4. The method of claim 1, further comprising:
as part of the analyzing, comparing, by the system, the second write stream value associated with the second portion of the file with the write stream-related index value; and
determining, by the system, whether the second write stream value satisfies the defined match criterion with regard to the write stream-related index value to facilitate the determining of whether the file access pattern associated with the second portion of the file is the sequential file access pattern.

5. The method of claim 1, wherein the result is a first result, wherein the write stream-related index value is a first write stream-related index value, wherein the file access pattern is a first file access pattern, and wherein the method further comprises:
based on a second result of analyzing a third write stream value and a second write stream-related index value, determining, by the system, whether a second file access pattern associated with a third portion of the file is the sequential file access pattern indicative of the sequential file access of the file.

6. The method of claim 5, further comprising:
in response to determining that the third write stream value does not satisfy the defined match criterion with regard to the second write stream-related index value, determining, by the system, that the second file access pattern associated with the third portion of the file is a random file access pattern and is not the sequential file access pattern, wherein the random file access pattern is indicative of a random file access of the file.

7. The method of claim 6, wherein the write transaction is a first write transaction, wherein the mapping is a first mapping, and wherein the method further comprises:
in response to determining that the second file access pattern associated with the third portion of the file is the random file access pattern indicative of the random file access of the file, determining, by the system, a time for committing a second write transaction associated with the third portion of the file and storing, in the data store, a second mapping associated with the third portion of the file and the random file access pattern based on an age of the second mapping since the second mapping was last utilized.

8. The method of claim 1, further comprising:
as part of the analyzing, comparing, by the system, the second write stream value associated with the second portion of the file with the write stream-related index value, wherein the write stream-related index value is associated with the track of the group of tracks in a memory; and
as part of the analyzing, and to facilitate the determining of whether the file access pattern associated with the second portion of the file is the sequential file access pattern and determining whether there is the overflow condition associated with the track of the group of tracks, comparing, by the system, the second write stream value with the total value associated with the track.

9. The method of claim 1, wherein the overflow condition indicates that respective write stream values, comprising the first write stream value, are stored in respective tracks, comprising the track, of the group of tracks and there is no track of the group of tracks that does not have any write stream value stored therein, and wherein the respective write stream values are associated with respective portions of the file relating to respective write streams of the file.

10. The method of claim 1, wherein the first portion of the file and the first write stream value are associated with a track index of respective track indexes associated with the file, wherein respective write stream-related index values correspond to the respective track indexes, wherein the respective write stream-related index values and the respective track indexes are associated with respective tracks, comprising the track, of the group of tracks, wherein the respective write stream-related index values comprise the write stream-related index value, and wherein the respective track indexes comprise the track index.

11. The method of claim 1, wherein the mapping is a first mapping, and wherein the method further comprises:
committing, by the system, the first mapping to store the first mapping or the first write stream value in the data store, wherein the first mapping relates to a write stream of the first portion of the file;
deleting, by the system, the first mapping or the first write stream value from the track associated with the write stream-related index value and a track index associated with the track, wherein the track is stored in a memory; and
storing, by the system, the second write stream value in the track associated with the write stream-related index value and the track index based on a second mapping of the second write stream value on to the track index, wherein the second mapping is based on the second write stream value and the number of tracks of the group of tracks.

12. The method of claim 1, further comprising:
based on determining that there is the overflow condition associated with the group of tracks:
determining, by the system, that there is the first portion of the file and the first write stream value associated with a track index of respective track indexes associated with the file, wherein the respective track indexes are associated with respective tracks of the group of tracks, and wherein the track index is associated with the track and the write stream-related index value;
determining, by the system, that an exclusive data lock associated with the first portion of the file is to be transitioned to a shared data lock with respect to the first portion of the file; and
transitioning, by the system, the exclusive data lock to the shared data lock with respect to the first portion of the file.

13. The method of claim 12, wherein the node is a first node, wherein the distributed node network comprises the first node and a second node, wherein the exclusive data lock grants, to a first client device associated with the distributed node network, exclusive access to the first portion of the file stored in the first node, wherein the shared data lock, in response to being implemented, is able to grant, to multiple client devices, comprising a second client device, associated with the distributed node network, shared or concurrent access to the first portion of the file stored in the first node, and wherein the second client device is associated with the second node or the first node.

14. A system, comprising:
at least one memory that stores computer executable components; and
at least one processor that executes computer executable components stored in the at least one memory, wherein the computer executable components comprise:

a node of a distributed network of nodes; and
a network management component that, with regard to a second section of a file being written to, and stored in, the node, analyzes a second write stream value associated with the second section of the file, a write stream-related index value, and a total value, and, based on a result of the analysis, determines whether a write pattern associated with the second section of the file is a sequential write pattern indicative of a sequential write of the file, to facilitate write transaction commitment management or data lock management associated with the file, wherein the write stream-related index value is associated with a track of a group of tracks associated with the file, wherein the total value is determined as a function of the write stream-related index value and a track number value associated with a number of tracks of the group of tracks,
wherein, based on the result indicating that the second write stream value satisfies a defined match criterion with respect to the total value, the network management component determines that the write pattern associated with the second section of the file is the sequential write pattern and there is an overflow state associated with the track, wherein the overflow state indicates that a first write stream value associated with a first section of the file is stored in the track associated with the write stream-related index value,
wherein, based on determining that the write pattern is the sequential write pattern and there is the overflow state, the network management component determines that a mapping is to be committed and stored in a data store, wherein the mapping is associated with the first section of the file, the first write stream value, and the sequential write pattern, and wherein the first write stream value is deleted from the track and the second write stream value is stored in the track.

15. The system of claim 14, wherein the mapping is a first mapping, wherein the network management component determines respective write stream values associated with respective sections of the file as a function of respective offset values and a data size of the respective sections of the file, generates a second mapping that maps the respective write stream values on to respective track indexes associated with respective tracks of the group of tracks stored in a memory as a function of the respective write stream values and the number of tracks of the group of tracks, and, based on the second mapping, stores the respective write stream values at the respective track indexes in the respective tracks in the memory, and wherein the respective write stream values associated with the respective sections of the file comprise the second write stream value associated with the second section of the file.

16. The system of claim 14, wherein, as part of the analysis, the network management component compares the second write stream value associated with the second section of the file with the write stream-related index value or the total value, and, based on the comparison, determines whether the write stream value satisfies the defined match criterion with regard to the write stream-related index value or with regard to the total value, to facilitate determining whether the write pattern associated with the second section of the file is the sequential write pattern or a random write pattern, and to facilitate determining whether there is the overflow state associated with the group of tracks, and wherein the random write pattern is indicative of a random write of the file.

17. The system of claim 14, wherein the write stream-related index value is a first write stream-related index value, wherein the total value is a first total value, wherein the track is a first track, wherein the write pattern is a first write pattern,
wherein, with regard to a third section of the file being written to, and stored in, the node, the network management component analyzes a third write stream value associated with the third section of the file, and a second write stream-related index value, and a second total value, wherein the second write stream-related index value is associated with a second track of the group of tracks, wherein the second total value is determined as a function of the second write stream-related index value and the track number value associated with the number of tracks,
wherein, in response to determining that the third write stream value does not satisfy the defined match criterion with regard to each of the second write stream-related index value and the second total value, the network management component determines that a second write pattern associated with the third section of the file is a random write pattern.

18. The system of claim 14,
wherein, in response determining that there is the overflow state associated with the group of tracks:
the network management component determines that there is the first section of the file and the first write stream value associated with a track index of respective track indexes associated with the file, wherein the respective track indexes are associated with respective tracks of the group of tracks, wherein the respective tracks comprise the track, wherein respective write stream-related index values are associated with the respective track indexes and the respective tracks, wherein the respective write stream-related index values comprise the write stream-related index value,
wherein the network management component commits the mapping and stores the mapping in the data store, and
wherein the network management component determines that an exclusive data lock associated with the first section of the file is to be switched to a shared data lock with respect to the first section of the file.

19. A non-transitory machine-readable medium, comprising executable instructions that, when executed by at least one processor, facilitate performance of operations, comprising:
with regard to a write operation to write a second section of a file to a node device of a distributed network of node devices, evaluating a second write stream value associated with the second section of the file, a write stream-related index value associated with a track of a group of tracks associated with the file, and an overflow value that is determined based on the write stream-related index value and a track number value associated with a number of tracks of the group of tracks;
based on a result of the evaluating, determining whether a write pattern associated with the second section of the file is a sequential write pattern indicative of a sequential write associated with the file or a random write pattern indicative of a random write associated with the file;

based on the result indicating that the second write stream value satisfies a defined match criterion with regard to the overflow value, determining that the write pattern associated with the second section of the file is the sequential write pattern and there is an overflow condition associated with the track, wherein the overflow condition indicates that a first write stream value associated with a first section of the file is stored in the track associated with the write stream-related index value; and based on determining that the write pattern is the sequential write pattern and there is the overflow condition, determining that a mapping is to be committed and stored in a data store, wherein the mapping is associated with the first section of the file, the first write stream value, and the sequential write pattern, and wherein the first write stream value is deleted from the track and the second write stream value is stored in the track.

20. The non-transitory machine-readable medium of claim 19, wherein the result is a first result, wherein the section of the file is a second section of the file, wherein the write stream value is a second write stream value, and wherein the operations further comprise:

based on the first result of the evaluating, determining whether there is the overflow condition associated with the track of the group of tracks associated with the file; and based on a second result of the determining of whether the write pattern associated with the second section of the file is the sequential write pattern, and based on a third result of determining of whether there is the overflow condition associated with the track:

determining whether to commit and store the mapping in the data store; and determining whether to transition an exclusive data lock associated with the first section of the file to a shared data lock with respect to the first section of the file.

* * * * *